United States Patent
Arness et al.

(10) Patent No.: US 7,988,420 B2
(45) Date of Patent: Aug. 2, 2011

(54) AIRFOIL SHAPE FOR A TURBINE BUCKET AND TURBINE INCORPORATING SAME

(75) Inventors: Brian Peter Arness, Simpsonville, SC (US); Tony A Chiurato, Simpsonville, SC (US); Sze Bun Brian Chan, Roswell, GA (US); Bogdan Razvan Raica, Mauldin, SC (US); Samar Barua, Bangalore Karnataka (IN); Jacob Charles Perry, II, Taylors, SC (US)

(73) Assignee: General Electric Company, Schenectady, NY (US)

( * ) Notice: Subject to any disclaimer, the term of this patent is extended or adjusted under 35 U.S.C. 154(b) by 1034 days.

(21) Appl. No.: 11/882,531

(22) Filed: Aug. 2, 2007

(65) Prior Publication Data

US 2009/0035146 A1     Feb. 5, 2009

(51) Int. Cl.
    *B64C 27/46*    (2006.01)
    *B64C 27/473*   (2006.01)
    *F01D 5/14*     (2006.01)
(52) U.S. Cl. ............... 416/223 A; 416/191; 416/DIG. 2
(58) Field of Classification Search .............. 416/143, 416/191, 223 A, 223 R, 243, DIG. 2, DIG. 5
    See application file for complete search history.

(56) References Cited

U.S. PATENT DOCUMENTS

| | | | |
|---|---|---|---|
| 5,980,209 A * | 11/1999 | Barry et al. | 416/223 A |
| 6,715,990 B1 * | 4/2004 | Arness et al. | 416/223 A |
| 6,739,839 B1 * | 5/2004 | Brown et al. | 416/223 A |
| 6,769,878 B1 * | 8/2004 | Parker et al. | 416/243 |
| 6,779,980 B1 | 8/2004 | Brittingham et al. | |
| 7,094,034 B2 * | 8/2006 | Fukuda et al. | 416/223 A |
| 7,306,436 B2 * | 12/2007 | Girgis et al. | 416/223 A |
| 7,520,724 B2 * | 4/2009 | Naik et al. | 416/97 R |

OTHER PUBLICATIONS

U.S. Application of Delong et al. U.S. Appl. No. 11/882,373, filed Aug. 1, 2007.
U.S. Application of Chiurato et al. U.S. Appl. No. 11/892,355, filed Aug. 22, 2007.

* cited by examiner

*Primary Examiner* — Edward Look
*Assistant Examiner* — Sean J Younger
(74) *Attorney, Agent, or Firm* — Nixon & Vanderhye PC

(57) ABSTRACT

Third stage turbine buckets have airfoil profiles substantially in accordance with Cartesian coordinate values of X, Y and Z' set forth Table I wherein X and Y values are in inches and the Z' values are non-dimensional values from 0 to 1 convertible to Z distances in inches by multiplying the Z' values by the height of the airfoil in inches. The X and Y values are distances which, when connected by smooth continuing arcs, define airfoil profile sections at each distance Z. The profile sections at each distance Z are joined smoothly to one another to form a complete airfoil shape. The X, Y and Z distances may be scalable as a function of the same constant or number to provide a scaled up or scaled down airfoil section for the bucket. The nominal airfoil given by the X, Y and Z distances lies within an envelope of +/−.0.040 inches in directions normal to the surface of the airfoil.

20 Claims, 2 Drawing Sheets

US 7,988,420 B2

AIRFOIL SHAPE FOR A TURBINE BUCKET AND TURBINE INCORPORATING SAME

BACKGROUND OF THE INVENTION

The present invention relates to an airfoil for a bucket of a stage of a gas turbine and particularly relates to a third stage turbine bucket airfoil profile.

Many system requirements must be met for each stage of the hot gas path section of a gas turbine in order to meet design goals including overall improved efficiency and airfoil loading. Particularly, the buckets of the third stage of the turbine section must meet the operating requirements for that particular stage and also be capable of efficient manufacture.

BRIEF DESCRIPTION OF THE INVENTION

The invention may be embodied in a turbine bucket including a bucket airfoil having an airfoil shape, said airfoil having a nominal profile substantially in accordance with Cartesian coordinate values of X, Y and Z' set forth in Table I wherein the Z' values are non-dimensional values from 0 to 1 convertible to Z distances in inches by multiplying the Z' values by a height of the airfoil in inches, and wherein X and Y are distances in inches which, when connected by smooth continuing arcs, define airfoil profile sections at each distance Z, the profile sections at the Z distances being joined smoothly with one another to form a complete airfoil shape.

The invention may also be embodied in a turbine bucket including a bucket airfoil having an uncoated nominal airfoil profile substantially in accordance with Cartesian coordinate values of X, Y and Z' set forth in Table I wherein the Z' values are non-dimensional values from 0 to 1 convertible to Z distances in inches by multiplying the Z' values by a height of the airfoil in inches, and wherein X and Y are distances in inches which, when connected by smooth continuing arcs, define airfoil profile sections at each Z distance, the profile sections at the Z distances being joined smoothly with one another to form a complete airfoil shape, the X, Y and Z distances being scalable as a function of the same constant or number to provide a scaled-up or scaled-down airfoil.

The invention may further be embodied in a turbine comprising a turbine wheel having a plurality of buckets, each of said buckets including an airfoil having an airfoil shape, said airfoil having a nominal profile substantially in accordance with Cartesian coordinate values of X, Y and Z' set forth in Table I wherein the Z' values are non-dimensional values from 0 to 1 convertible to Z distances in inches by multiplying the Z' values by a height of the airfoil in inches, and wherein X and Y are distances in inches which, when connected by smooth continuing arcs, define the airfoil profile sections at each distance Z, the profile sections at the Z distances being joined smoothly with one another to form a complete airfoil shape.

BRIEF DESCRIPTION OF THE DRAWINGS

These and other objects and advantages of this invention, will be more completely understood and appreciated by careful study of the following more detailed description of the presently preferred example embodiments of the invention taken in conjunction with the accompanying drawings, in which.

DETAILED DESCRIPTION OF THE INVENTION

Figure 1:
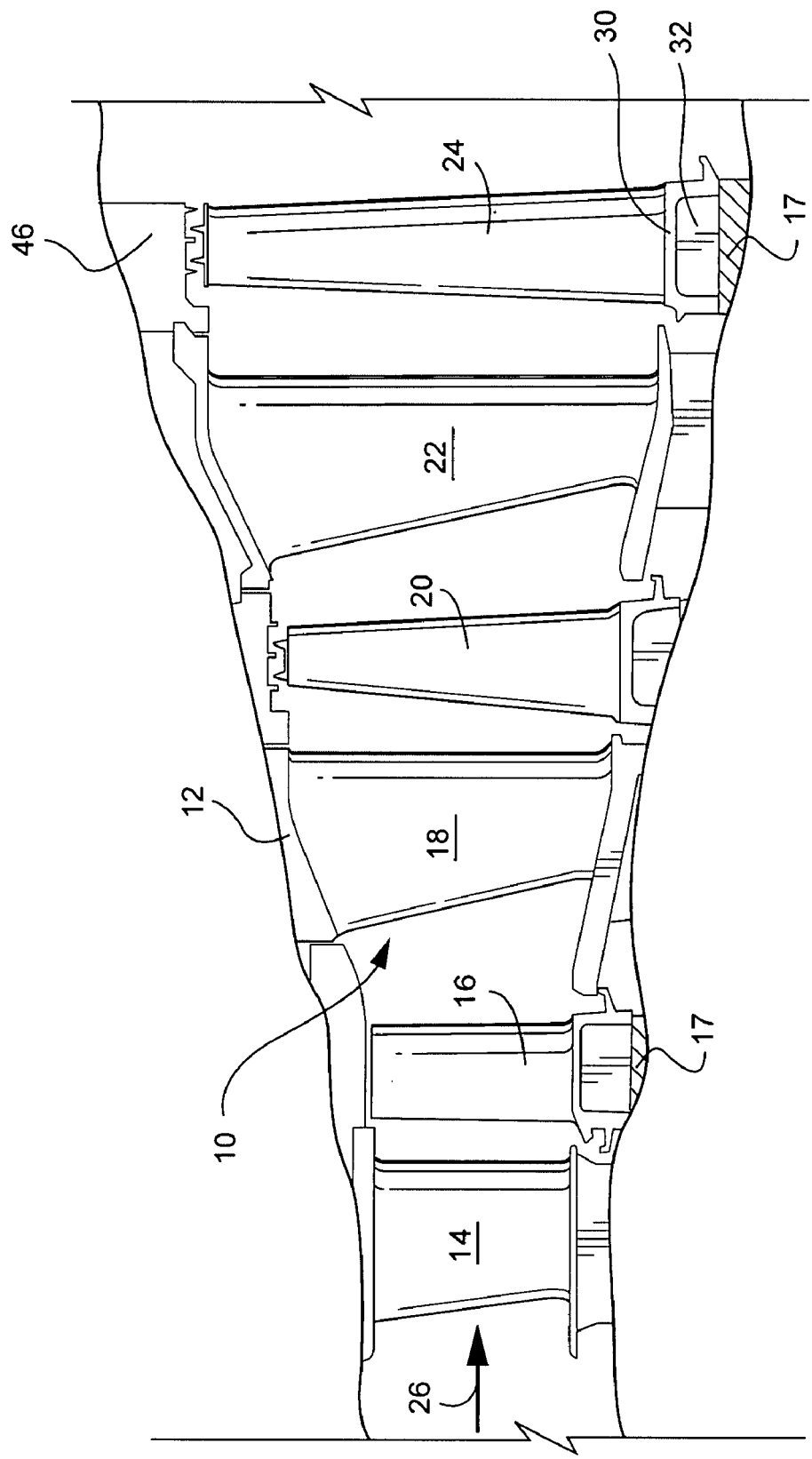
FIG. 1 is a schematic representation of a hot gas path through multiple stages of a gas turbine and illustrates a third stage bucket airfoil according to an example embodiment of the present invention.

Referring now to the drawings, particularly to FIG. 1, there is illustrated a hot gas path, generally designated 10, of a gas turbine 12 including a plurality of turbine stages. Three stages are illustrated. For example, the first stage comprises a plurality of circumferentially spaced nozzles 14 and buckets 16. The nozzles are circumferentially spaced one from the other and fixed about the axis of the rotor. The first stage buckets 16, of course, are mounted on the turbine rotor 17. A second stage of the turbine 12 is also illustrated, including a plurality of circumferentially spaced nozzles 18 and a plurality of circumferentially spaced buckets 20 mounted on the rotor. The third stage is also illustrated including a plurality of circumferentially spaced nozzles 22 and buckets 24 mounted on rotor 17. It will be appreciated that the nozzles and buckets lie in the hot gas path 10 of the turbine, the direction of flow of the hot gas through the hot gas path 10 being indicated by the arrow 26.

Figure 2:
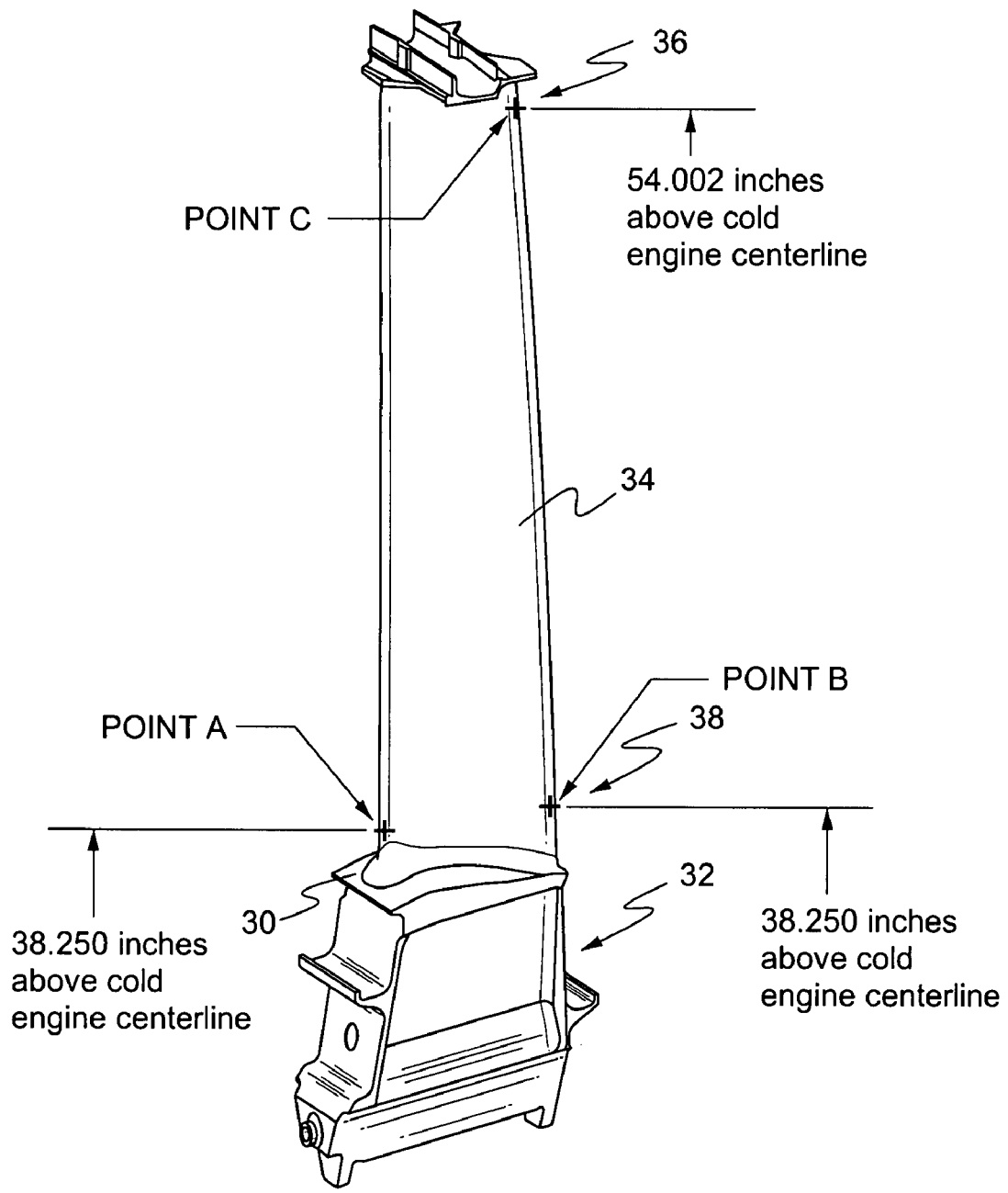
FIG. 2 is a perspective view of a bucket according to an example embodiment of the present invention.

Referring to FIG. 2, it will be appreciated that the buckets, for example, the buckets 24 of the third stage are mounted on a rotor wheel, not shown, forming part of rotor 17 and include platforms 30. It will also be appreciated that each bucket 24 has a bucket airfoil 34 as illustrated in FIG. 2. Thus, each of the buckets 24 has a bucket airfoil profile at any cross-section from the bucket root 32 to the bucket tip 36 in the shape of an airfoil 34. The X-axis 38, for purposes of defining the airfoil shape in an example embodiment of the turbine, lies at 38.250 inches along a radius from the turbine centerline. This corresponds to the non-dimensional Z' value of Table I at Z' equals 0.000. The tip 36 of the bucket airfoil, for purposes of defining the airfoil shape in an example embodiment of the turbine, lies at 54.002 inches along a radius from the turbine centerline. Thus, the actual height of the bucket 24, that is, the actual Z height of the bucket, is 15.752 inches from root to tip.

The CV7241 hot gas path requires a third stage airfoil that meets system requirements of efficiency and loading. To define the airfoil shape of each third stage bucket airfoil, there is a unique set or loci of points in space that meet the stage requirements and can be manufactured. This unique loci of points meets the requirements for stage efficiency and are arrived at by iteration between aerodynamic and mechanical loadings enabling the turbine to run in an efficient, safe and smooth manner. These points are unique and specific to the system and are not obvious to those skilled in the art. The loci which defines the bucket airfoil profile of the invention comprises a set of 1,226 points with X, Y and Z dimensions relative to the coordinate system established as shown in FIG. 2. More specifically, the coordinate system is set relative to the airfoil and is fully defined by points A, B and C. Points A and B are both located 38.250 inches above the cold rotor centerline. Point A lies on the leading-edge airfoil surface and Point B lies on the trailing-edge airfoil surface. Point C is located 54.002 inches above the cold rotor centerline on the airfoil trailing-edge surface. The coordinate system origin is located at Point A. Points A and B define the positive X-axis 38. Points A, B and C define the positive X-Z plane. The Y axis is then defined using Right-Hand Rule methodology. As mentioned above, the Cartesian coordinate system of X, Y and Z' values given in Table I below defines the profile of the bucket airfoil at various locations along its length. The coordinate values for the X and Y coordinates are set forth in inches in Table I although other units of dimensions may be used when the values are appropriately converted. The radial Z values from B to C are set forth in Table I in non-dimensional form (Z') from 0 to 1. Negative values indicate a Z vertically below the X-axis 38 extending from point A to point B To convert the Z' value to a Z coordinate value, e.g., in inches, the non-dimensional Z' value given in Table I is multiplied by the height of airfoil in inches. As described above, the Cartesian coordinate system has orthogonally-related X, Y and Z axes and the X axis lies parallel to the turbine rotor centerline, i.e., the rotary axis and a positive X coordinate value is axial toward the aft, i.e., exhaust end of the turbine. The positive Y coordinate value extends tangentially in the direction of rotation of the rotor and the positive Z coordinate value is radially outwardly toward the bucket tip.

By defining X and Y coordinate values at selected locations in a Z direction normal to the X, Y plane, the profile section of the bucket airfoil, at each Z distance along the length of the airfoil can be ascertained. By connecting the X and Y values with smooth continuing arcs, each profile section at each distance Z is fixed. The airfoil profiles of the various surface locations between the distances Z are determined by smoothly connecting the adjacent profile sections to one another to form the airfoil profile.

The Table I values are generated and shown to four decimal places for determining the profile of the airfoil. As the blade heats up in surface, stress and temperature will cause a change in the X, Y and Z's. Accordingly, the values for the profile given in Table I represent ambient, non-operating or non-hot conditions and are for an uncoated airfoil.

There are typical manufacturing tolerances as well as coatings which must be accounted for in the actual profile of the airfoil. Each section is joined smoothly with the other sections to form the complete airfoil shape. It will therefore be appreciated that +/- typical manufacturing tolerances, i.e., +/- values, including any coating thicknesses, are additive to the X and Y values given in Table I below. Accordingly, a distance of +/-0.040 inches in a direction normal to any surface location along the airfoil profile defines an airfoil profile envelope for this particular bucket airfoil design and turbine, i.e., a range of variation between measured points on the actual airfoil surface at nominal cold or room temperature and the ideal position of those points as given in the Table below at the same temperature. The bucket airfoil design is robust to this range of variation without impairment of mechanical and aerodynamic functions.

| Point No. | X | Y | Z' |
|---|---|---|---|
| 1 | 3.3649 | 0.4331 | 5.6388E−01 |
| 2 | 3.8814 | −0.1368 | 6.7715E−01 |
| 3 | 0.3358 | 0.9709 | 4.5063E−01 |
| 4 | 2.0474 | 0.9977 | 6.7629E−01 |
| 5 | 0.2065 | 0.7815 | 2.2509E−01 |
| 6 | 3.06 | 0.3475 | 9.0246E−01 |
| 7 | 3.1074 | 0.457 | 3.3818E−01 |
| 8 | 3.5285 | 0.8682 | −6.5326E−04 |
| 9 | 3.2571 | 0.4467 | 6.7671E−01 |
| 10 | 0.9666 | 1.8702 | 9.9863E−01 |
| 11 | 3.4619 | 0.0951 | 7.8981E−01 |
| 12 | 1.4972 | 1.2886 | −1.1381E−01 |
| 13 | 3.1942 | 1.0306 | −7.7360E−04 |
| 14 | 4.5138 | −0.0797 | 1.1290E−01 |
| 15 | 1.3807 | 0.584 | −4.4124E−04 |
| 16 | 0.0759 | 0.5233 | 2.2529E−01 |
| 17 | 4.4288 | −0.1766 | 3.3865E−01 |
| 18 | 0.2091 | 0.2239 | 1.1267E−01 |
| 19 | 0.2336 | 1.4558 | 6.7595E−01 |
| 20 | 4.5288 | −0.1976 | 2.2583E−01 |
| 21 | 3.47 | 0.1582 | 9.0261E−01 |
| 22 | 3.0808 | 1.0803 | −8.1371E−04 |
| 23 | 2.9942 | 0.3644 | 9.9976E−01 |
| 24 | 3.6834 | −0.0626 | 7.8993E−01 |
| 25 | 0.1106 | 1.3019 | 5.6323E−01 |
| 26 | 2.8332 | 0.5766 | 4.5093E−01 |
| 27 | 4.2708 | −0.1234 | 4.5146E−01 |
| 28 | 2.3641 | 0.7984 | 4.5076E−01 |
| 29 | 1.7747 | 1.3763 | 1.1181E−01 |
| 30 | 1.7742 | 0.9963 | 4.5061E−01 |
| 31 | 2.3997 | 0.8313 | 9.0210E−01 |
| 32 | 4.2464 | 0.7339 | −1.1339E−01 |
| 33 | 2.1763 | 0.9878 | 9.0198E−01 |
| 34 | 1.1308 | 1.3609 | 2.2466E−01 |
| 35 | 1.4982 | 1.6081 | 7.8868E−01 |
| 36 | 2.4251 | 1.0184 | 7.8912E−01 |
| 37 | 0.7337 | 1.9219 | 9.9859E−01 |
| 38 | 4.8462 | 0.0171 | −1.1461E−05 |
| 39 | 0.1498 | 0.682 | 3.3801E−01 |
| 40 | 4.1 | −0.0953 | 5.6427E−01 |
| 41 | 0.2942 | 1.7576 | 9.0140E−01 |
| 42 | 4.112 | 0.3226 | 1.1260E−01 |
| 43 | 2.6447 | 1.0917 | 2.2486E−01 |
| 44 | 3.4178 | 0.7696 | 1.1226E−01 |
| 45 | 4.4025 | −0.2023 | 3.3868E−01 |
| 46 | 4.8323 | 0.1516 | −1.1296E−01 |
| 47 | 3.3009 | 0.3535 | 7.8962E−01 |
| 48 | 3.6196 | −0.0164 | 7.8990E−01 |
| 49 | 3.7718 | 0.1127 | 3.3844E−01 |
| 50 | 2.5427 | 1.1371 | 2.2483E−01 |
| 51 | 1.6599 | 1.5219 | 7.8874E−01 |
| 52 | −0.0148 | 0.1958 | −1.4899E−04 |
| 53 | 4.7153 | 0.2053 | −1.1300E−01 |
| 54 | 0.2618 | 1.8346 | 9.0135E−01 |
| 55 | 1.784 | 1.274 | 9.9908E−01 |
| 56 | 4.8352 | 0 | 0.0000E+00 |
| 57 | 1.9499 | 1.1402 | 9.0187E−01 |
| 58 | 2.1232 | 1.2895 | 2.2471E−01 |
| 59 | 2.7381 | 0.7237 | −1.1339E−01 |
| 60 | 3.4458 | 0.0813 | 9.9997E−01 |
| 61 | 2.0108 | 1.3252 | 6.7605E−01 |
| 62 | 3.4103 | 0.3332 | 6.7679E−01 |
| 63 | 4.3494 | 0.0072 | 1.1284E−01 |
| 64 | 1.8959 | 1.3808 | 7.8885E−01 |
| 65 | 2.7203 | 0.8432 | 6.7641E−01 |
| 66 | 3.7161 | −0.0843 | 7.8995E−01 |
| 67 | 2.6945 | 0.6181 | 9.0226E−01 |
| 68 | 4.635 | 0.0375 | −2.8652E−05 |
| 69 | 0.1715 | 0.4259 | 2.2536E−01 |
| 70 | 0.1244 | 0.0041 | −5.7304E−06 |
| 71 | 4.5106 | −0.1936 | 2.2583E−01 |
| 72 | 3.8912 | 0.3513 | 2.2542E−01 |
| 73 | 0.2361 | 0.4482 | 2.2535E−01 |
| 74 | 2.5031 | 0.7452 | 7.8932E−01 |
| 75 | 3.445 | 0.1092 | 9.9995E−01 |
| 76 | 0.4017 | 1.9015 | 9.0129E−01 |
| 77 | 4.8323 | 0.1516 | −1.1296E−01 |
| 78 | −0.1033 | 0.0327 | −1.1287E−01 |
| 79 | 3.5798 | 0.0639 | 6.7700E−01 |
| 80 | 3.4032 | 0.0489 | 1.0000E+00 |
| 81 | 2.4246 | 0.7626 | 3.3795E−01 |
| 82 | 3.8569 | 0.2715 | 3.3831E−01 |
| 83 | 0.2255 | 1.2126 | 5.6329E−01 |
| 84 | 3.0433 | 0.6608 | 5.6371E−01 |
| 85 | 3.47 | 0.2266 | 4.5119E−01 |
| 86 | 3.6808 | 0.3914 | 3.3823E−01 |
| 87 | 1.3207 | 1.6456 | 6.7580E−01 |
| 88 | 4.2723 | −0.1819 | 4.5150E−01 |
| 89 | 0.1047 | 0.4312 | 2.2536E−01 |
| 90 | 1.9242 | 1.1808 | 9.9915E−01 |
| 91 | 3.5984 | 0.0297 | 9.0270E−01 |
| 92 | 0.1026 | 1.2661 | 5.6325E−01 |
| 93 | 3.3343 | 0.2643 | 9.0253E−01 |
| 94 | 3.5937 | 0.0135 | 9.0272E−01 |
| 95 | 0.4181 | 0.3261 | 1.1260E−01 |
| 96 | 1.8095 | 1.3889 | 3.3748E−01 |
| 97 | 3.0757 | 0.3862 | 6.7676E−01 |
| 98 | 0.614 | 1.1587 | 2.2481E−01 |

-continued

| Point No. | X | Y | Z' |
|---|---|---|---|
| 99 | 3.92 | −0.1436 | 6.7715E−01 |
| 100 | 4.8419 | 0.0947 | −6.8764E−05 |
| 101 | 4.725 | −0.0105 | 5.7304E−06 |
| 102 | 0.2767 | 0.8683 | 2.2503E−01 |
| 103 | 2.2679 | 0.8375 | 4.5073E−01 |
| 104 | 4.0874 | −0.1197 | 4.5145E−01 |
| 105 | 2.0922 | 0.7523 | −5.6731E−04 |
| 106 | 4.5652 | 0.0261 | 1.1282E−01 |
| 107 | 1.504 | 1.2472 | 6.7611E−01 |
| 108 | 3.7761 | 0.9602 | −1.1356E−01 |
| 109 | 1.0574 | 0.7822 | 2.2509E−01 |
| 110 | 0.2172 | 0.6901 | 1.1232E−01 |
| 111 | 2.667 | 0.6288 | 9.9956E−01 |
| 112 | 0.1477 | 1.3516 | 5.6319E−01 |
| 113 | 3.6196 | −0.0164 | 7.8990E−01 |
| 114 | 2.1427 | 1.3711 | −1.1387E−01 |
| 115 | 3.8978 | 0.1184 | 2.2559E−01 |
| 116 | 0.1131 | 0.3583 | −1.1311E−01 |
| 117 | 0.2586 | 1.2152 | 4.5045E−01 |
| 118 | 4.3089 | 0.2041 | −1.5472E−04 |
| 119 | 2.1992 | 0.9867 | 9.9930E−01 |
| 120 | 1.5624 | 1.3779 | 9.0169E−01 |
| 121 | 0.9699 | 1.5486 | 7.8872E−01 |
| 122 | 1.3323 | 1.6859 | 7.8862E−01 |
| 123 | 2.2761 | 1.1252 | 7.8904E−01 |
| 124 | 0.1322 | 1.4806 | 6.7593E−01 |
| 125 | 0.4041 | 1.8836 | 9.9862E−01 |
| 126 | 0.3859 | 0.1199 | −9.1686E−05 |
| 127 | 3.0117 | 0.5048 | 3.3814E−01 |
| 128 | 1.8452 | 0.6212 | −1.1331E−01 |
| 129 | 3.4294 | 0.0588 | 9.9999E−01 |
| 130 | 4.4062 | −0.1126 | 3.3861E−01 |
| 131 | 0.3961 | 1.1364 | 3.3767E−01 |
| 132 | 1.8452 | 1.4198 | 6.7598E−01 |
| 133 | 3.2844 | 0.49 | 5.6383E−01 |
| 134 | 0.164 | 1.6812 | 7.8862E−01 |
| 135 | 2.0393 | 1.2641 | 9.0178E−01 |
| 136 | 4.1607 | −0.1628 | 4.5148E−01 |
| 137 | 4.0127 | 0.8501 | −1.1348E−01 |
| 138 | 0.9663 | 1.4137 | 3.3746E−01 |
| 139 | 0.442 | 1.8479 | 7.8850E−01 |
| 140 | 1.1555 | 1.2378 | −9.2832E−04 |
| 141 | 0.1045 | 1.2845 | 5.6324E−01 |
| 142 | 1.3488 | 1.5295 | 9.9888E−01 |
| 143 | 4.3907 | −0.1019 | 3.3860E−01 |
| 144 | 3.4011 | 0.3654 | 2.2540E−01 |
| 145 | 1.153 | 0.496 | −3.7247E−04 |
| 146 | 0.6623 | 1.7329 | 6.7574E−01 |
| 147 | 0.357 | 1.8427 | 9.9865E−01 |
| 148 | 1.5966 | 1.2104 | 6.7613E−01 |
| 149 | 3.4387 | 0.1219 | 9.9994E−01 |
| 150 | 4.795 | 0.1333 | −9.7416E−05 |
| 151 | 2.7982 | 0.5235 | 9.9964E−01 |
| 152 | 4.0757 | 0.2255 | 2.2551E−01 |
| 153 | 0.1301 | 1.5589 | 6.7587E−01 |
| 154 | 1.0072 | 1.5194 | 4.5022E−01 |
| 155 | 0.7325 | 1.2419 | 5.6327E−01 |
| 156 | 0.1001 | 0.9941 | 4.5061E−01 |
| 157 | 3.1327 | 0.2928 | 9.0250E−01 |
| 158 | 3.4868 | 0.2764 | 6.7684E−01 |
| 159 | 1.8264 | 1.0452 | 5.6342E−01 |
| 160 | 3.869 | 0.4162 | −3.1517E−04 |
| 161 | 3.3735 | 0.2976 | 7.8966E−01 |
| 162 | 1.1241 | 1.3681 | 6.7602E−01 |
| 163 | 3.6636 | 0.0736 | 7.8983E−01 |
| 164 | 0.2336 | 0.9533 | 4.5065E−01 |
| 165 | 0.3597 | 1.4851 | 5.6309E−01 |
| 166 | 0.433 | 1.454 | 6.7595E−01 |
| 167 | 3.4393 | 0.0688 | 9.9998E−01 |
| 168 | 2.1452 | 1.2662 | 5.6325E−01 |
| 169 | 0.2515 | 1.8206 | 9.0136E−01 |
| 170 | 0.3957 | 1.7976 | 9.9868E−01 |
| 171 | 0.8103 | 1.6947 | 9.0145E−01 |
| 172 | 2.3841 | 1.0062 | 9.0197E−01 |
| 173 | 4.1676 | 0.1621 | 2.2556E−01 |
| 174 | 3.418 | 0.9243 | −6.9337E−04 |
| 175 | 1.7317 | 0.6882 | −5.1573E−04 |
| 176 | 0.7471 | 0.8609 | 3.3787E−01 |
| 177 | 2.201 | 1.1778 | 7.8900E−01 |
| 178 | 1.4965 | 0.6227 | −4.6989E−04 |
| 179 | 1.0426 | 1.669 | 9.9878E−01 |
| 180 | 0.4503 | 1.7423 | 9.0141E−01 |
| 181 | 1.76 | 1.3618 | −1.0257E−03 |
| 182 | 3.699 | −0.0746 | 7.8994E−01 |
| 183 | 3.9377 | −0.1338 | 6.7715E−01 |
| 184 | 2.1012 | 1.0392 | 9.0194E−01 |
| 185 | 4.5981 | 0.2584 | −1.1304E−01 |
| 186 | 2.1354 | 0.9508 | 6.7633E−01 |
| 187 | 1.2827 | 1.4541 | 3.3743E−01 |
| 188 | 3.9447 | −0.1071 | 5.6429E−01 |
| 189 | 3.3747 | 0.0578 | 9.9999E−01 |
| 190 | 1.1297 | 1.6148 | 5.6299E−01 |
| 191 | 0.3333 | 1.4537 | 6.7595E−01 |
| 192 | 3.0986 | 0.6254 | 1.1237E−01 |
| 193 | 1.273 | 1.2769 | −9.5697E−04 |
| 194 | 0.6447 | 0.8303 | 3.3790E−01 |
| 195 | 0.8832 | 1.7226 | 9.9874E−01 |
| 196 | 0.2035 | 1.6188 | 6.7583E−01 |
| 197 | 1.4864 | 0.9565 | 3.3780E−01 |
| 198 | 0.6775 | 0.8975 | −1.1351E−01 |
| 199 | 2.8593 | 0.6354 | 9.0225E−01 |
| 200 | 0.2718 | 1.4408 | 5.6312E−01 |
| 201 | 1.937 | 0.8571 | 2.2504E−01 |
| 202 | 2.2732 | 1.3679 | −1.1387E−01 |
| 203 | 2.1253 | 1.3305 | 1.1184E−01 |
| 204 | 0.107 | 1.0449 | 4.5058E−01 |
| 205 | 2.0495 | 1.2809 | 7.8892E−01 |
| 206 | 1.2204 | 1.3423 | 6.7603E−01 |
| 207 | 2.0151 | 1.057 | 7.8909E−01 |
| 208 | 3.7926 | 0.0485 | 6.7701E−01 |
| 209 | 0.496 | 1.9134 | 9.9860E−01 |
| 210 | 2.5835 | 0.6917 | 7.8936E−01 |
| 211 | 3.1387 | 0.8322 | 2.2505E−01 |
| 212 | 3.915 | 0.4525 | 1.1250E−01 |
| 213 | 1.8746 | 0.9701 | 4.5064E−01 |
| 214 | 4.1964 | −0.0287 | 2.2570E−01 |
| 215 | 1.6729 | 1.0191 | 4.5060E−01 |
| 216 | 1.5387 | 1.5996 | 9.0152E−01 |
| 217 | 4.3092 | 0.193 | 1.1269E−01 |
| 218 | 3.5617 | 0.3773 | 4.5108E−01 |
| 219 | 2.7335 | 1.2125 | −9.1113E−04 |
| 220 | −0.0085 | −0.1837 | −1.1270E−01 |
| 221 | 0.092 | 0.7674 | 3.3794E−01 |
| 222 | 1.0418 | 1.8441 | 9.9865E−01 |
| 223 | 4.2595 | 0.0987 | 2.2560E−01 |
| 224 | 1.4377 | 1.1631 | 5.6333E−01 |
| 225 | 2.8778 | 0.699 | 1.1232E−01 |
| 226 | 0.1196 | 1.3181 | 5.6321E−01 |
| 227 | 2.999 | 0.5534 | 2.2527E−01 |
| 228 | 2.3352 | 1.2195 | 2.2476E−01 |
| 229 | 3.2507 | 0.6796 | −1.1335E−01 |
| 230 | 0.0547 | 0.3778 | 1.1256E−01 |
| 231 | 0.156 | 0.9494 | 4.5065E−01 |
| 232 | 3.4293 | 0.1324 | 9.9994E−01 |
| 233 | 3.3615 | 0.0677 | 9.9998E−01 |
| 234 | 2.3755 | 1.3111 | −9.8562E−04 |
| 235 | 4.2563 | −0.1956 | 4.5151E−01 |
| 236 | 0.3213 | 1.8709 | 9.0132E−01 |
| 237 | 2.5859 | 0.7152 | 2.2515E−01 |
| 238 | 4.3896 | 0.378 | −2.8652E−04 |
| 239 | 1.4147 | 1.5175 | 4.5022E−01 |
| 240 | 0.427 | 1.7897 | 9.9869E−01 |
| 241 | 1.5083 | 1.3371 | 7.8888E−01 |
| 242 | 0.1637 | 1.4652 | 6.7594E−01 |
| 243 | 2.4033 | 1.3583 | −1.1386E−01 |
| 244 | 0.6872 | 1.6105 | 7.8868E−01 |
| 245 | 4.4801 | 0.3099 | −1.1307E−01 |
| 246 | 3.629 | 0.6026 | −1.1330E−01 |
| 247 | 3.6564 | 1.0123 | −1.1360E−01 |
| 248 | 0.6023 | 0.2329 | −1.7764E−04 |
| 249 | 1.3126 | 1.7245 | 9.0143E−01 |
| 250 | 2.0593 | 1.3145 | 5.6321E−01 |
| 251 | 0.114 | 1.51 | 6.7591E−01 |
| 252 | 0.4392 | 0.5376 | 2.2528E−01 |

| Point No. | X | Y | Z' |
|---|---|---|---|
| 253 | 0.3718 | 0.8679 | 1.1219E-01 |
| 254 | 4.7135 | -0.1077 | 1.1292E-01 |
| 255 | 2.23 | 1.2161 | 5.6329E-01 |
| 256 | 0.1196 | 1.3181 | 5.6321E-01 |
| 257 | 4.0111 | -0.1488 | 5.6431E-01 |
| 258 | 2.5204 | 0.901 | 9.0205E-01 |
| 259 | 1.4966 | 1.4491 | 9.9895E-01 |
| 260 | 0.8111 | 1.2631 | 2.2473E-01 |
| 261 | 2.3525 | 0.7068 | -1.1337E-01 |
| 262 | 2.5966 | 1.0673 | 3.3772E-01 |
| 263 | 4.5068 | 0.0641 | 1.1279E-01 |
| 264 | 3.7573 | 0.0015 | 7.8988E-01 |
| 265 | 2.0472 | 0.8444 | 2.2505E-01 |
| 266 | 3.1306 | 0.4232 | 9.0241E-01 |
| 267 | 2.92 | 0.5099 | 5.6382E-01 |
| 268 | 0.6129 | 1.4163 | 4.5030E-01 |
| 269 | 2.1917 | 0.8174 | 1.1223E-01 |
| 270 | 0.9635 | 1.6975 | 9.9876E-01 |
| 271 | 1.4827 | 1.4218 | 9.0166E-01 |
| 272 | 2.9702 | 0.7793 | 4.5078E-01 |
| 273 | 4.0901 | 0.3125 | -2.3494E-04 |
| 274 | 0.5914 | 1.6226 | 7.8866E-01 |
| 275 | 2.3156 | 1.0585 | 9.0193E-01 |
| 276 | 1.9936 | 1.1332 | 9.9918E-01 |
| 277 | 1.372 | 1.252 | -1.1378E-01 |
| 278 | 3.8779 | -0.0659 | 5.6425E-01 |
| 279 | 1.1662 | 0.944 | 3.3781E-01 |
| 280 | 2.7897 | 1.2968 | -1.1382E-01 |
| 281 | 2.7829 | 0.9639 | 3.3780E-01 |
| 282 | 4.0969 | 0.0204 | 2.2567E-01 |
| 283 | 2.482 | 0.7533 | 6.7648E-01 |
| 284 | 0.8371 | 0.5287 | 1.1244E-01 |
| 285 | 1.2662 | 0.5417 | -4.0686E-04 |
| 286 | 3.204 | 0.5469 | 5.6379E-01 |
| 287 | 0.0939 | 0.4175 | -3.1517E-04 |
| 288 | 0.0742 | 0.4891 | 2.2531E-01 |
| 289 | 3.6304 | 0.3902 | 1.1255E-01 |
| 290 | 3.0565 | 0.7989 | 3.3792E-01 |
| 291 | 4.6953 | -0.0612 | 1.1289E-01 |
| 292 | 1.6366 | 1.3515 | -1.0143E-03 |
| 293 | 2.9376 | 0.6328 | 7.8941E-01 |
| 294 | 3.5634 | 0.2195 | 6.7688E-01 |
| 295 | 1.2278 | 1.606 | 5.6300E-01 |
| 296 | 0.0837 | 0.5566 | 2.2526E-01 |
| 297 | 1.7131 | 1.3193 | 9.9904E-01 |
| 298 | 1.4001 | 1.6714 | 9.9878E-01 |
| 299 | 3.0549 | 0.7221 | 4.5082E-01 |
| 300 | 0.1967 | 0.4584 | -1.1319E-01 |
| 301 | 4.1143 | -0.1086 | 5.6429E-01 |
| 302 | 3.1825 | 0.355 | 5.6394E-01 |
| 303 | 2.7436 | 0.6108 | 5.6374E-01 |
| 304 | -0.0352 | 0.0711 | -5.1573E-05 |
| 305 | 0.3531 | 0.9497 | 2.2497E-01 |
| 306 | 1.9065 | 1.3841 | 4.5032E-01 |
| 307 | 1.7137 | 1.4517 | 4.5027E-01 |
| 308 | 0.0958 | 0.4882 | 1.1248E-01 |
| 309 | 3.3892 | 0.0506 | 9.9999E-01 |
| 310 | 1.849 | 1.1555 | 7.8901E-01 |
| 311 | 1.077 | 1.2845 | 1.1187E-01 |
| 312 | 0.8579 | 1.1972 | 1.1194E-01 |
| 313 | 3.5532 | -0.0137 | 9.0273E-01 |
| 314 | 4.8204 | -0.014 | 1.1461E-05 |
| 315 | 4.1228 | -0.1261 | 5.6430E-01 |
| 316 | 4.6684 | -0.155 | 1.1296E-01 |
| 317 | 3.3675 | 0.1827 | 9.9990E-01 |
| 318 | 4.6511 | -0.1548 | 1.1296E-01 |
| 319 | 0.5392 | 1.0128 | 4.5060E-01 |
| 320 | 1.4022 | 1.4641 | 9.0163E-01 |
| 321 | 0.1342 | 1.2235 | 5.6328E-01 |
| 322 | 3.0952 | 0.4069 | 5.6390E-01 |
| 323 | 0.2383 | 0.6973 | 3.3800E-01 |
| 324 | 1.1551 | 1.5796 | 9.0154E-01 |
| 325 | 0.2039 | 1.6527 | 7.8864E-01 |
| 326 | 0.4952 | 1.6305 | 7.8866E-01 |
| 327 | 0.7669 | 0.2062 | -1.1300E-01 |
| 328 | 4.9361 | 0.3634 | -1.1311E-01 |
| 329 | 2.4523 | 0.9537 | 9.0201E-01 |
| 330 | 2.6148 | 0.7714 | 9.9946E-01 |
| 331 | 0.1797 | 0.684 | 3.3801E-01 |
| 332 | 0.1589 | 1.7132 | 7.8860E-01 |
| 333 | 3.8577 | -0.0004 | 6.7704E-01 |
| 334 | 0.095 | 0.5889 | 2.2524E-01 |
| 335 | -0.1033 | 0.0327 | -1.1287E-01 |
| 336 | 4.9406 | 0.167 | -1.1297E-01 |
| 337 | 3.2664 | 0.3172 | 9.0249E-01 |
| 338 | 4.6847 | -0.1491 | 1.1295E-01 |
| 339 | 0.8766 | 1.5733 | 7.8870E-01 |
| 340 | 1.4744 | 0.514 | -1.1323E-01 |
| 341 | 2.7014 | 0.7545 | -5.6731E-04 |
| 342 | 4.5761 | -0.1313 | 2.2578E-01 |
| 343 | 0.9291 | 1.4099 | 6.7598E-01 |
| 344 | 1.9268 | 1.3136 | 9.9905E-01 |
| 345 | 0.1182 | 1.0683 | 4.5056E-01 |
| 346 | 0.6255 | 0.4317 | 1.1252E-01 |
| 347 | 1.0531 | 0.6153 | 1.1238E-01 |
| 348 | 4.366 | -0.2007 | 3.3867E-01 |
| 349 | 1.2489 | 1.2087 | -1.1375E-01 |
| 350 | 3.0419 | 0.8878 | 2.2501E-01 |
| 351 | 2.0939 | 1.3026 | 4.5038E-01 |
| 352 | 1.5361 | 1.138 | 5.6335E-01 |
| 353 | 0.1028 | 0.1948 | 1.1269E-01 |
| 354 | 0.1894 | 1.387 | 5.6316E-01 |
| 355 | 4.0529 | -0.0599 | 5.6425E-01 |
| 356 | 0.3147 | 0.2728 | 1.1264E-01 |
| 357 | 1.8264 | 0.8651 | 2.2503E-01 |
| 358 | 3.6443 | 0.5119 | -3.8393E-04 |
| 359 | 1.6045 | 0.8663 | 2.2503E-01 |
| 360 | 1.4113 | 1.6159 | 6.7583E-01 |
| 361 | 1.3208 | 1.5046 | 9.0159E-01 |
| 362 | 3.224 | 0.6075 | 4.5091E-01 |
| 363 | 0.2898 | 1.6591 | 6.7580E-01 |
| 364 | 1.5709 | 1.0385 | 4.5058E-01 |
| 365 | 4.0645 | 0.0265 | 4.5134E-01 |
| 366 | 0.4188 | 1.8901 | 9.9861E-01 |
| 367 | 1.4158 | 1.6482 | 7.8865E-01 |
| 368 | 0.7633 | 1.3497 | 3.3751E-01 |
| 369 | 2.1161 | 1.168 | 9.9916E-01 |
| 370 | 1.3531 | 0.4708 | -1.1319E-01 |
| 371 | 3.7572 | 0.4653 | -3.4955E-04 |
| 372 | 0.1338 | 0.8661 | 3.3787E-01 |
| 373 | 0.737 | 1.595 | 5.6300E-01 |
| 374 | 0.494 | 0.1765 | -1.3180E-04 |
| 375 | 0.2373 | 0.9947 | 3.3778E-01 |
| 376 | 0.3455 | 1.7472 | 9.0141E-01 |
| 377 | 4.5368 | -0.0925 | 2.2575E-01 |
| 378 | 0.2656 | 1.8003 | 7.8853E-01 |
| 379 | 4.1139 | -0.1631 | 5.6433E-01 |
| 380 | 3.1601 | 0.333 | 6.7679E-01 |
| 381 | 4.0135 | 0.3875 | 1.1255E-01 |
| 382 | 1.1283 | 1.1588 | -1.1371E-01 |
| 383 | 2.901 | 1.0535 | 1.1205E-01 |
| 384 | 3.0626 | 0.695 | -5.2146E-04 |
| 385 | 2.4065 | 1.1635 | 3.3765E-01 |
| 386 | 3.5821 | 0.2113 | 3.3836E-01 |
| 387 | 1.6568 | 1.379 | 1.1181E-01 |
| 388 | 2.3417 | 0.8511 | 7.8924E-01 |
| 389 | 3.1441 | 0.3144 | 7.8965E-01 |
| 390 | 2.8738 | 0.7301 | 6.7649E-01 |
| 391 | 2.3038 | 1.02 | 9.9927E-01 |
| 392 | 1.6153 | 1.479 | 4.5025E-01 |
| 393 | 0.459 | 1.7859 | 9.9869E-01 |
| 394 | 2.8241 | 0.5305 | 7.8948E-01 |
| 395 | 4.4292 | -0.147 | 2.2579E-01 |
| 396 | 3.8463 | 0.0902 | 5.6414E-01 |
| 397 | -0.1433 | -0.0558 | -1.1280E-01 |
| 398 | 4.3841 | -0.2053 | 3.3868E-01 |
| 399 | 2.943 | 0.7195 | -5.3865E-04 |
| 400 | 3.7539 | -0.0809 | 7.8994E-01 |
| 401 | 0.2908 | 0.7822 | 1.1225E-01 |
| 402 | 3.6861 | 0.205 | 5.6405E-01 |
| 403 | 0.0831 | -0.0049 | 5.7304E-06 |
| 404 | 0.2361 | 0.4482 | 2.2535E-01 |
| 405 | 4.3513 | 0.0352 | 2.2566E-01 |
| 406 | 1.3384 | 1.1849 | 5.6331E-01 |

-continued

| Point No. | X | Y | Z' |
|---|---|---|---|
| 407 | 3.1394 | 0.6648 | 4.5086E-01 |
| 408 | 0.3978 | 1.7441 | 9.0141E-01 |
| 409 | 0.3587 | 1.8269 | 9.9866E-01 |
| 410 | 4.0696 | 0.5669 | -4.2405E-04 |
| 411 | 1.1764 | 1.4478 | 3.3743E-01 |
| 412 | 2.9897 | 0.4751 | 9.9968E-01 |
| 413 | 4.9361 | 0.3634 | -1.1311E-01 |
| 414 | 3.1784 | 0.3286 | 9.9979E-01 |
| 415 | 2.0974 | 0.6725 | -1.1335E-01 |
| 416 | 3.3012 | 0.4138 | 2.2537E-01 |
| 417 | 3.5899 | 0.0618 | 9.0268E-01 |
| 418 | 3.1465 | 0.7421 | 3.3797E-01 |
| 419 | 2.0009 | 1.3449 | 4.5035E-01 |
| 420 | 3.2238 | 0.26 | 7.8969E-01 |
| 421 | 3.7987 | 0.4137 | 2.2537E-01 |
| 422 | 0.6362 | 1.7737 | 9.9870E-01 |
| 423 | 0.4374 | 0.9924 | 4.5062E-01 |
| 424 | 3.9625 | 0.6292 | -4.7562E-04 |
| 425 | 1.1886 | 1.7824 | 9.9869E-01 |
| 426 | 0.8124 | 1.9099 | 9.9860E-01 |
| 427 | 4.2679 | -0.0154 | 3.3853E-01 |
| 428 | 1.1379 | 1.2178 | 5.6329E-01 |
| 429 | 1.6011 | 1.4327 | 3.3744E-01 |
| 430 | 2.9271 | 0.5823 | 9.0229E-01 |
| 431 | 0.9975 | 0.3206 | -1.1308E-01 |
| 432 | 0.0547 | 0.3778 | 1.1256E-01 |
| 433 | 3.6992 | 0.2174 | 2.2552E-01 |
| 434 | 1.7943 | 1.445 | 5.6312E-01 |
| 435 | 1.3307 | 1.7104 | 9.9875E-01 |
| 436 | 4.2154 | -0.1954 | 4.5151E-01 |
| 437 | 0.2007 | -0.0999 | -1.1277E-01 |
| 438 | 3.9547 | -0.0983 | 6.7712E-01 |
| 439 | 1.8055 | 0.9265 | 3.3783E-01 |
| 440 | 1.5156 | 1.5011 | 4.5023E-01 |
| 441 | 4.0135 | -0.0775 | 4.5142E-01 |
| 442 | 2.6476 | 0.6697 | 4.5086E-01 |
| 443 | 0.8072 | 1.844 | 7.8850E-01 |
| 444 | 1.0764 | 1.8289 | 9.0135E-01 |
| 445 | 3.2026 | 0.4085 | 3.3822E-01 |
| 446 | 1.3892 | 1.4534 | 3.3743E-01 |
| 447 | 2.4225 | 0.7983 | 7.8928E-01 |
| 448 | 2.5726 | 0.9097 | 7.8920E-01 |
| 449 | 3.5311 | 0.146 | 5.6409E-01 |
| 450 | 2.4683 | 0.7845 | 9.9944E-01 |
| 451 | 2.5654 | 0.7084 | 5.6367E-01 |
| 452 | 3.5358 | 1.0622 | -1.1364E-01 |
| 453 | 4.3513 | 0.0352 | 2.2566E-01 |
| 454 | 0.8202 | 0.3432 | -2.5787E-04 |
| 455 | 1.0602 | 0.9298 | 3.3782E-01 |
| 456 | 0.095 | 0.5889 | 2.2524E-01 |
| 457 | 2.3661 | 0.9704 | 9.9931E-01 |
| 458 | -0.0285 | 0.0297 | -2.2921E-05 |
| 459 | 1.9723 | 1.3606 | 5.6318E-01 |
| 460 | 2.0973 | 1.0065 | 7.8913E-01 |
| 461 | 1.669 | 1.5007 | 9.9891E-01 |
| 462 | 2.6902 | 1.0164 | 3.3776E-01 |
| 463 | 1.7989 | 1.4086 | 9.9897E-01 |
| 464 | 2.6526 | 0.6501 | 6.7656E-01 |
| 465 | 1.165 | 0.8093 | 2.2507E-01 |
| 466 | 2.9888 | 0.6639 | 1.1234E-01 |
| 467 | 0.985 | 1.6441 | 9.0149E-01 |
| 468 | 1.5796 | 1.5659 | 7.8871E-01 |
| 469 | 0.4112 | 1.793 | 9.9869E-01 |
| 470 | 2.0753 | 0.8186 | 1.1222E-01 |
| 471 | 3.5036 | 0.632 | -1.1332E-01 |
| 472 | 2.8747 | 0.91 | 3.3784E-01 |
| 473 | 2.6211 | 0.6718 | 9.0222E-01 |
| 474 | 1.5968 | 0.5536 | -1.1325E-01 |
| 475 | 0.9661 | 1.2441 | 1.1191E-01 |
| 476 | 1.1207 | 1.6376 | 9.9880E-01 |
| 477 | 1.843 | 0.8052 | 1.1223E-01 |
| 478 | 3.7926 | 0.0485 | 6.7701E-01 |
| 479 | 0.1375 | 0.4226 | 2.2536E-01 |
| 480 | 4.7083 | 0.1868 | -1.4326E-04 |
| 481 | 2.8668 | 0.7197 | -1.1338E-01 |
| 482 | 4.0413 | 0.1714 | 1.1271E-01 |
| 483 | 2.7921 | 0.7442 | 7.8932E-01 |
| 484 | 3.4441 | 0.1985 | 5.6405E-01 |
| 485 | 1.4643 | 1.643 | 9.0149E-01 |
| 486 | 4.851 | 0.0766 | -5.7304E-05 |
| 487 | 2.5021 | 1.1164 | 3.3768E-01 |
| 488 | 1.211 | 1.532 | 4.5021E-01 |
| 489 | 3.9504 | -0.0786 | 6.7710E-01 |
| 490 | 4.2106 | 0.2577 | 1.1265E-01 |
| 491 | 2.178 | 1.162 | 9.0185E-01 |
| 492 | 2.4883 | 1.0106 | 6.7629E-01 |
| 493 | 3.3284 | 0.2261 | 6.7688E-01 |
| 494 | 4.6351 | -0.1482 | 1.1295E-01 |
| 495 | 3.769 | 0.3316 | 3.3827E-01 |
| 496 | 0.082 | 0.456 | 2.2534E-01 |
| 497 | 2.6862 | 1.1511 | 1.1198E-01 |
| 498 | 0.1309 | 0.9553 | 4.5064E-01 |
| 499 | 2.496 | 1.2828 | -9.6270E-04 |
| 500 | 1.8631 | 1.3614 | 9.9901E-01 |
| 501 | 4.2957 | -0.0782 | 2.2574E-01 |
| 502 | 1.423 | 1.4899 | 9.9892E-01 |
| 503 | 2.9949 | 0.5292 | 9.0233E-01 |
| 504 | -0.1251 | -0.0107 | -1.1283E-01 |
| 505 | 1.7794 | 1.1305 | 6.7619E-01 |
| 506 | 2.7394 | 0.6722 | 9.9953E-01 |
| 507 | 2.0625 | 1.0849 | 9.9922E-01 |
| 508 | 0.9504 | 1.0686 | 4.5056E-01 |
| 509 | 2.5797 | 0.7647 | -5.7304E-04 |
| 510 | 3.3892 | 0.0506 | 9.9999E-01 |
| 511 | 2.5883 | 0.8481 | 9.0209E-01 |
| 512 | 3.5263 | 0.4421 | 1.1251E-01 |
| 513 | 3.2141 | 0.8888 | 1.1217E-01 |
| 514 | 0.3407 | 0.7281 | 3.3798E-01 |
| 515 | 3.8549 | 0.6907 | -5.2146E-04 |
| 516 | 4.0614 | -0.1792 | 5.6434E-01 |
| 517 | 0.8901 | 1.8924 | 9.9861E-01 |
| 518 | 3.3337 | 0.39 | 6.7675E-01 |
| 519 | 0.1984 | 1.4587 | 6.7595E-01 |
| 520 | 0.486 | 1.9183 | 9.0128E-01 |
| 521 | 2.2414 | 1.0695 | 9.9923E-01 |
| 522 | 0.1003 | 1.0199 | 4.5060E-01 |
| 523 | 4.1194 | 0.0893 | 3.3845E-01 |
| 524 | 0.5214 | 0.3797 | 1.1256E-01 |
| 525 | 3.5188 | 0.5978 | 2.2523E-01 |
| 526 | 4.9885 | 0.2667 | -1.1304E-01 |
| 527 | 2.5607 | 1.0019 | 5.6345E-01 |
| 528 | 0.2042 | 0.4359 | 2.2535E-01 |
| 529 | 1.0313 | 1.6179 | 5.6299E-01 |
| 530 | 2.7224 | 0.8894 | 5.6354E-01 |
| 531 | 3.1985 | 0.3702 | 9.0245E-01 |
| 532 | 2.6433 | 0.8994 | 6.7637E-01 |
| 533 | -0.1422 | -0.1498 | -1.1273E-01 |
| 534 | -0.0148 | 0.1958 | -1.4899E-04 |
| 535 | 0.9328 | 1.6156 | 5.6299E-01 |
| 536 | 0.3988 | 1.635 | 7.8865E-01 |
| 537 | 1.7059 | 1.4134 | 3.3746E-01 |
| 538 | 0.5221 | 1.0953 | 2.2486E-01 |
| 539 | 2.3357 | 0.7694 | -5.7877E-04 |
| 540 | 1.389 | 1.6847 | 9.0146E-01 |
| 541 | 0 | 0 | 0.0000E+00 |
| 542 | 1.8283 | 1.4132 | 9.0166E-01 |
| 543 | 3.5365 | -0.0111 | 9.0273E-01 |
| 544 | 2.7916 | 0.6886 | 9.0221E-01 |
| 545 | 4.0806 | -0.1818 | 5.6434E-01 |
| 546 | 2.9843 | 0.4227 | 7.8956E-01 |
| 547 | 0.7437 | 1.915 | 9.0128E-01 |
| 548 | 0.5719 | 1.9247 | 9.0128E-01 |
| 549 | 2.0154 | 0.8859 | 3.3786E-01 |
| 550 | 2.131 | 1.0361 | 9.9926E-01 |
| 551 | 3.4022 | 0.2113 | 9.0257E-01 |
| 552 | 3.9836 | 0.2885 | 2.2547E-01 |
| 553 | 0.8962 | 1.0398 | -1.1362E-01 |
| 554 | 0.2473 | 1.8038 | 9.0137E-01 |
| 555 | 3.597 | 0.0465 | 9.0269E-01 |
| 556 | 4.6985 | -0.1385 | 1.1295E-01 |
| 557 | 0.3802 | 1.689 | 6.7578E-01 |
| 558 | 2.6417 | 0.946 | 5.6349E-01 |
| 559 | 0.8816 | 0.2646 | -1.1304E-01 |
| 560 | 3.6459 | 0.3194 | 4.5112E-01 |

-continued

| Point No. | X | Y | Z' |
|---|---|---|---|
| 561 | 1.1628 | 0.654 | 1.1235E−01 |
| 562 | 0.6506 | 1.0848 | 1.1202E−01 |
| 563 | 1.9285 | 1.3734 | 6.7601E−01 |
| 564 | 4.283 | 0.4412 | −3.3236E−04 |
| 565 | 3.771 | −0.0126 | 7.8990E−01 |
| 566 | 0.1394 | 0.1992 | 1.1269E−01 |
| 567 | 2.9142 | 0.4562 | 9.0238E−01 |
| 568 | 1.3834 | 0.8479 | 2.2504E−01 |
| 569 | 3.2073 | 0.5838 | 1.1240E−01 |
| 570 | 0.4503 | 1.7423 | 9.0141E−01 |
| 571 | 1.9694 | 1.3144 | 9.0174E−01 |
| 572 | 2.2122 | 1.2506 | 3.3758E−01 |
| 573 | 0.2078 | 0.9503 | 4.5065E−01 |
| 574 | 0.3681 | 1.8139 | 9.9867E−01 |
| 575 | 0.1188 | 1.2337 | 5.6328E−01 |
| 576 | 3.8779 | −0.0659 | 5.6425E−01 |
| 577 | 1.9323 | 1.1067 | 7.8905E−01 |
| 578 | 2.0123 | 1.3678 | −1.1387E−01 |
| 579 | 1.3051 | 1.3439 | 1.1183E−01 |
| 580 | 1.2384 | 1.5433 | 9.0156E−01 |
| 581 | 1.136 | 1.6929 | 6.7577E−01 |
| 582 | 3.9389 | 0.2267 | 1.1267E−01 |
| 583 | 3.4211 | 0.4919 | 1.1247E−01 |
| 584 | 2.5386 | 0.7805 | 1.1225E−01 |
| 585 | 3.2988 | 0.6331 | −4.7562E−04 |
| 586 | 0.1205 | 1.4937 | 6.7592E−01 |
| 587 | 4.2188 | −0.1175 | 3.3861E−01 |
| 588 | 1.2476 | 1.7209 | 7.8859E−01 |
| 589 | 3.8364 | 0.2819 | 1.1263E−01 |
| 590 | 2.3508 | 1.0721 | 7.8908E−01 |
| 591 | 3.4232 | 0.0738 | 9.0267E−01 |
| 592 | 0.311 | 1.7527 | 9.0141E−01 |
| 593 | 0.3213 | 1.8709 | 9.0132E−01 |
| 594 | 4.3627 | −0.1121 | 2.2576E−01 |
| 595 | 4.4749 | −0.0501 | 2.2572E−01 |
| 596 | 3.3795 | 0.2776 | 4.5115E−01 |
| 597 | 0.9951 | 1.8572 | 9.0133E−01 |
| 598 | 2.2137 | 0.7636 | −5.7304E−04 |
| 599 | 2.8971 | 0.5971 | 2.2523E−01 |
| 600 | 3.2443 | 0.2796 | 6.7683E−01 |
| 601 | 0.9445 | 0.5734 | 1.1241E−01 |
| 602 | 1.2436 | 1.4544 | 7.8879E−01 |
| 603 | 2.0076 | 1.3614 | −1.0257E−03 |
| 604 | 2.267 | 0.9369 | 9.9933E−01 |
| 605 | 2.2525 | 1.1724 | 6.7616E−01 |
| 606 | 0.2848 | 0.5547 | −1.1325E−01 |
| 607 | 1.2737 | 1.5675 | 9.9885E−01 |
| 608 | 1.2737 | 0.8312 | 2.2505E−01 |
| 609 | 3.446 | 0.2416 | 7.8970E−01 |
| 610 | 0.7823 | 1.594 | 7.8869E−01 |
| 611 | 0.4289 | 1.3278 | 4.5037E−01 |
| 612 | 4.0135 | −0.0775 | 4.5142E−01 |
| 613 | 4.9638 | 0.3374 | −1.1309E−01 |
| 614 | 2.7376 | 0.5978 | 6.7660E−01 |
| 615 | 3.7464 | −0.0458 | 6.7708E−01 |
| 616 | 0.1108 | 0.8243 | 3.3790E−01 |
| 617 | 4.1763 | 0.5042 | −3.7820E−04 |
| 618 | 1.1564 | 1.797 | 9.0137E−01 |
| 619 | 3.7914 | −0.0126 | 5.6421E−01 |
| 620 | 2.3968 | 1.1114 | 5.6337E−01 |
| 621 | 2.499 | 0.9643 | 7.8916E−01 |
| 622 | 4.9822 | 0.3042 | −1.1307E−01 |
| 623 | 2.3238 | 0.7981 | 3.3792E−01 |
| 624 | 3.1038 | 0.5601 | 6.7662E−01 |
| 625 | 3.7416 | 0.0744 | 4.5131E−01 |
| 626 | 3.4148 | 0.5685 | 3.3810E−01 |
| 627 | 3.5256 | 0.3192 | 5.6397E−01 |
| 628 | 3.9502 | −0.118 | 6.7713E−01 |
| 629 | 3.0427 | 1.2328 | −1.1376E−01 |
| 630 | 1.2737 | 0.6893 | 1.1232E−01 |
| 631 | 2.0133 | 1.3269 | 3.3752E−01 |
| 632 | 2.8454 | 0.9938 | 2.2493E−01 |
| 633 | 3.2283 | 0.4094 | 7.8958E−01 |
| 634 | 3.5409 | 0.0396 | 7.8986E−01 |
| 635 | 2.9068 | 0.4923 | 6.7668E−01 |
| 636 | 2.4904 | 0.8709 | 9.9938E−01 |
| 637 | 0.327 | 1.2183 | 5.6329E−01 |
| 638 | 0.4734 | 0.735 | −1.1339E−01 |
| 639 | 2.8003 | 0.8929 | 4.5069E−01 |
| 640 | 2.2606 | 0.9034 | 7.8920E−01 |
| 641 | 0.5735 | 0.8187 | −1.1346E−01 |
| 642 | 0.6408 | 0.6302 | 2.2521E−01 |
| 643 | 0.1653 | 0.5187 | −3.8966E−04 |
| 644 | 1.6122 | 1.5547 | 9.0156E−01 |
| 645 | 4.1439 | 0.1164 | 1.1275E−01 |
| 646 | 2.7216 | 0.6415 | 3.3804E−01 |
| 647 | 2.2656 | 0.805 | 2.2508E−01 |
| 648 | 0.3385 | 0.4911 | 2.2531E−01 |
| 649 | 1.5389 | 1.3747 | 1.1181E−01 |
| 650 | 2.222 | 0.8307 | 3.3790E−01 |
| 651 | 1.054 | 1.074 | 4.5056E−01 |
| 652 | 2.1133 | 1.2903 | 3.3755E−01 |
| 653 | 0.2255 | 1.2126 | 5.6329E−01 |
| 654 | 3.0166 | 0.4793 | 4.5100E−01 |
| 655 | 1.1901 | 1.3178 | 1.1185E−01 |
| 656 | 1.7305 | 1.0787 | 5.6339E−01 |
| 657 | 3.1232 | 0.6974 | −1.1336E−01 |
| 658 | 0.032 | 0.3103 | −2.3494E−04 |
| 659 | 2.4808 | 0.7173 | −1.1338E−01 |
| 660 | 0.1076 | 1.2484 | 5.6327E−01 |
| 661 | 0.4351 | 1.0254 | 2.2491E−01 |
| 662 | 1.7968 | 1.2384 | 9.0179E−01 |
| 663 | 0.1585 | 1.123 | 4.5052E−01 |
| 664 | 1.3652 | 1.0655 | 4.5056E−01 |
| 665 | 3.4452 | 0.3762 | 5.6392E−01 |
| 666 | 0.2383 | 0.6973 | 3.3800E−01 |
| 667 | 0.4731 | 1.7107 | 6.7576E−01 |
| 668 | 2.0257 | 1.09 | 9.0191E−01 |
| 669 | 2.0156 | 0.9713 | 5.6347E−01 |
| 670 | 3.6398 | 0.1626 | 6.7692E−01 |
| 671 | 3.2977 | 0.3596 | 3.3825E−01 |
| 672 | 0.2092 | 0.6899 | 3.3801E−01 |
| 673 | 3.9799 | 0.3652 | −2.7506E−04 |
| 674 | 0.3023 | 1.6386 | 7.8865E−01 |
| 675 | 1.0622 | 1.5203 | 7.8874E−01 |
| 676 | 4.1523 | −0.0825 | 3.3858E−01 |
| 677 | 3.4124 | 0.1723 | 6.7692E−01 |
| 678 | 0.1581 | 1.6966 | 7.8861E−01 |
| 679 | 2.8637 | 0.4705 | 9.9968E−01 |
| 680 | 1.5947 | 1.294 | 7.8891E−01 |
| 681 | 0.1207 | 0.6888 | 3.3801E−01 |
| 682 | 3.5924 | 0.4508 | 3.3818E−01 |
| 683 | 4.4079 | 0.1284 | 1.1274E−01 |
| 684 | 0.6543 | 1.9275 | 9.9858E−01 |
| 685 | 2.927 | 0.5242 | 9.9964E−01 |
| 686 | 2.6562 | 0.795 | 9.0213E−01 |
| 687 | 1.7154 | 0.8682 | 2.2503E−01 |
| 688 | 3.7772 | −0.0503 | 7.8992E−01 |
| 689 | 2.7407 | 0.6238 | 4.5089E−01 |
| 690 | 0.381 | 1.8043 | 9.9868E−01 |
| 691 | 4.5523 | −0.1031 | 2.2576E−01 |
| 692 | 4.5068 | 0.0641 | 1.1279E−01 |
| 693 | 2.7942 | 1.1037 | 1.1201E−01 |
| 694 | 3.5911 | 0.1296 | 7.8979E−01 |
| 695 | 2.2762 | 1.2104 | 4.5045E−01 |
| 696 | 0.2336 | 1.4558 | 6.7595E−01 |
| 697 | 3.2698 | 0.303 | 5.6398E−01 |
| 698 | 1.1089 | 1.5292 | 4.5021E−01 |
| 699 | 0.1819 | 0.9487 | 4.5065E−01 |
| 700 | 3.4953 | 0.0184 | 9.0271E−01 |
| 701 | 2.8189 | 0.5973 | 3.3807E−01 |
| 702 | 1.973 | 1.3313 | 7.8888E−01 |
| 703 | 4.1212 | 0.4522 | −1.1318E−01 |
| 704 | 0.2438 | 0.6145 | −4.6416E−04 |
| 705 | 2.6287 | 1.0037 | 4.5061E−01 |
| 706 | 3.19 | 0.2049 | 9.9988E−01 |
| 707 | 3.1804 | 0.5034 | 6.7666E−01 |
| 708 | 0.4823 | 1.1989 | 3.3762E−01 |
| 709 | 0.5747 | 1.9252 | 9.9859E−01 |
| 710 | 0.2091 | 0.2239 | 1.1267E−01 |
| 711 | 2.1255 | 1.2297 | 7.8896E−01 |
| 712 | 0.8636 | 1.3855 | 3.3748E−01 |
| 713 | 0.1108 | 0.8243 | 3.3790E−01 |
| 714 | 1.6412 | 1.3326 | 9.0172E−01 |

| Point No. | X | Y | Z' |
|---|---|---|---|
| 715 | 1.4938 | 0.8596 | 2.2504E−01 |
| 716 | 3.7534 | 0.5698 | −1.1327E−01 |
| 717 | 1.3252 | 1.5914 | 5.6301E−01 |
| 718 | 3.2347 | 0.7752 | 2.2510E−01 |
| 719 | 1.7971 | 1.3651 | 2.2465E−01 |
| 720 | 0.1206 | 1.544 | 6.7588E−01 |
| 721 | 1.7569 | 1.4613 | 9.0163E−01 |
| 722 | 1.2289 | 1.6714 | 6.7579E−01 |
| 723 | 0.2525 | 1.6418 | 7.8865E−01 |
| 724 | 3.3045 | 0.2313 | 9.9986E−01 |
| 725 | 3.2915 | 1.1538 | −1.1371E−01 |
| 726 | 2.5675 | 0.7019 | 6.7652E−01 |
| 727 | 4.2813 | −0.1628 | 4.5148E−01 |
| 728 | 1.9214 | 1.0093 | 5.6344E−01 |
| 729 | 1.6996 | 0.9409 | 3.3782E−01 |
| 730 | 2.3538 | 1.2721 | 1.1189E−01 |
| 731 | 0.5295 | 1.2349 | 5.6328E−01 |
| 732 | 2.9871 | 0.4019 | 9.0242E−01 |
| 733 | 1.5169 | 1.5464 | 5.6304E−01 |
| 734 | 3.1154 | 0.3774 | 9.9975E−01 |
| 735 | 1.3521 | 1.3892 | 2.2464E−01 |
| 736 | 3.7337 | 0.3366 | 1.1259E−01 |
| 737 | 2.8223 | 0.5451 | 6.7664E−01 |
| 738 | 2.2247 | 0.6919 | −1.1336E−01 |
| 739 | 3.3931 | 0.4926 | 4.5099E−01 |
| 740 | 3.5378 | 0.1051 | 9.0265E−01 |
| 741 | 2.3961 | 0.8039 | 6.7644E−01 |
| 742 | 4.8121 | 0.1222 | −9.1686E−05 |
| 743 | 3.7163 | 0.1056 | 6.7696E−01 |
| 744 | 2.4543 | 1.1102 | 4.5053E−01 |
| 745 | 3.4774 | 0.435 | 4.5104E−01 |
| 746 | 2.6527 | 0.7577 | 1.1227E−01 |
| 747 | 3.6182 | 0.6452 | 1.1236E−01 |
| 748 | 0.5402 | 0.0841 | −1.1291E−01 |
| 749 | 4.6812 | −0.051 | 1.1288E−01 |
| 750 | 1.1977 | 1.6036 | 9.9883E−01 |
| 751 | 4.708 | 0.4901 | −1.1321E−01 |
| 752 | 2.5419 | 1.0576 | 4.5057E−01 |
| 753 | 2.8829 | 0.7752 | 5.6362E−01 |
| 754 | 1.2602 | 1.7475 | 9.9872E−01 |
| 755 | 3.9385 | −0.0623 | 6.7709E−01 |
| 756 | 0.6532 | 0.1458 | −1.1295E−01 |
| 757 | 2.5329 | 1.343 | −1.1385E−01 |
| 758 | 0.631 | 1.2399 | 5.6327E−01 |
| 759 | 2.2937 | 0.8465 | 5.6356E−01 |
| 760 | 3.8976 | 0.1444 | 4.5125E−01 |
| 761 | 0.6413 | 1.0313 | 4.5059E−01 |
| 762 | 3.4953 | 0.0184 | 9.0271E−01 |
| 763 | 3.3164 | 0.83 | 1.1222E−01 |
| 764 | 0.8529 | 1.7316 | 6.7574E−01 |
| 765 | 4.8225 | 0.4276 | −1.1316E−01 |
| 766 | 3.7259 | 0.0253 | 7.8987E−01 |
| 767 | 0.711 | 0.2886 | −2.1775E−04 |
| 768 | 0.4418 | 0.7628 | 3.3795E−01 |
| 769 | 0.847 | 1.0596 | 4.5057E−01 |
| 770 | 1.8839 | 1.4042 | 5.6315E−01 |
| 771 | 1.2332 | 0.424 | −1.1316E−01 |
| 772 | 2.6618 | 1.3223 | −1.1383E−01 |
| 773 | 2.566 | 0.9552 | 6.7633E−01 |
| 774 | 0.3897 | 1.8763 | 9.9862E−01 |
| 775 | 3.4476 | 0.0953 | 9.9997E−01 |
| 776 | 2.3079 | 0.8107 | 1.1223E−01 |
| 777 | 1.4217 | 1.5714 | 5.6302E−01 |
| 778 | 1.8822 | 1.3579 | −1.1386E−01 |
| 779 | 3.9974 | 0.0693 | 2.2563E−01 |
| 780 | 0.4276 | 0.0218 | −1.1286E−01 |
| 781 | 0.7429 | 0.6738 | 2.2517E−01 |
| 782 | 2.1088 | 1.2133 | 9.0181E−01 |
| 783 | 2.9504 | 0.6734 | 6.7654E−01 |
| 784 | 3.7354 | −0.0873 | 7.8995E−01 |
| 785 | 0.1304 | 1.0875 | 4.5054E−01 |
| 786 | −0.0568 | −0.1881 | −1.1270E−01 |
| 787 | 1.9068 | 1.3445 | 2.2467E−01 |
| 788 | 2.677 | 0.7217 | 9.9949E−01 |
| 789 | 0.8286 | 1.9009 | 9.0129E−01 |
| 790 | 3.5695 | −0.0095 | 9.0273E−01 |
| 791 | 0.3141 | 1.0684 | 3.3772E−01 |
| 792 | 0.1146 | 1.5275 | 6.7590E−01 |
| 793 | 0.0443 | 0.2326 | 1.1266E−01 |
| 794 | 1.2385 | 1.2032 | 5.6330E−01 |
| 795 | 3.1003 | 0.508 | 2.2530E−01 |
| 796 | 2.1091 | 0.9314 | 5.6350E−01 |
| 797 | 4.1299 | 0.7926 | −1.1344E−01 |
| 798 | 0.1515 | 0.5921 | 1.1240E−01 |
| 799 | 4.2028 | −0.0725 | 4.5142E−01 |
| 800 | 2.3097 | 0.8538 | 6.7640E−01 |
| 801 | 2.9042 | 0.4767 | 7.8952E−01 |
| 802 | 4.4522 | −0.0472 | 1.1288E−01 |
| 803 | 1.6753 | 1.5063 | 6.7591E−01 |
| 804 | 2.1856 | 1.2577 | 4.5042E−01 |
| 805 | 3.0065 | 1.1008 | 1.1209E−01 |
| 806 | 0.5195 | 1.3749 | 4.5033E−01 |
| 807 | 4.6234 | −0.0121 | 1.1285E−01 |
| 808 | 4.7625 | −0.0262 | 1.7191E−05 |
| 809 | 2.2402 | 1.3039 | 1.1186E−01 |
| 810 | 4.7083 | 0.1868 | −1.4326E−04 |
| 811 | 2.2469 | 1.1104 | 9.0189E−01 |
| 812 | 2.7658 | 0.7304 | 1.1229E−01 |
| 813 | 0.7104 | 1.2149 | 2.2477E−01 |
| 814 | 1.9588 | 1.0434 | 6.7626E−01 |
| 815 | 3.2054 | 0.2382 | 9.0254E−01 |
| 816 | 3.5835 | 0 | 9.0273E−01 |
| 817 | 3.7685 | −0.0678 | 7.8994E−01 |
| 818 | 0.1472 | 1.4712 | 6.7594E−01 |
| 819 | 2.7327 | 0.5763 | 9.9960E−01 |
| 820 | 2.6154 | 1.2497 | −9.3978E−04 |
| 821 | 1.0106 | 1.1024 | −1.1367E−01 |
| 822 | 0.8068 | 1.4805 | 4.5025E−01 |
| 823 | 2.6906 | 0.6785 | 2.2517E−01 |
| 824 | 4.4309 | −0.14 | 3.3862E−01 |
| 825 | 3.9897 | −0.0135 | 5.6421E−01 |
| 826 | 1.7276 | 0.7909 | 1.1225E−01 |
| 827 | 1.3158 | 1.3134 | 6.7606E−01 |
| 828 | 1.6337 | 1.1098 | 5.6337E−01 |
| 829 | 2.8854 | 0.8363 | 4.5073E−01 |
| 830 | 0.3641 | 1.857 | 9.9864E−01 |
| 831 | 4.8546 | 0.0566 | −4.0113E−05 |
| 832 | 3.5303 | 0.5557 | −4.1832E−04 |
| 833 | 3.201 | 0.4614 | 2.2534E−01 |
| 834 | 3.1109 | 0.9458 | 1.1213E−01 |
| 835 | 2.7971 | 0.7867 | 6.7645E−01 |
| 836 | 4.5931 | 0.552 | −1.1325E−01 |
| 837 | 3.417 | 0.0519 | 9.9999E−01 |
| 838 | 0.3771 | 0.6469 | −1.1333E−01 |
| 839 | 1.7394 | 1.4762 | 7.8877E−01 |
| 840 | 2.1192 | 0.8601 | 3.3787E−01 |
| 841 | 0.7526 | 1.1441 | 1.1198E−01 |
| 842 | 0.4191 | 0.7893 | −5.9596E−04 |
| 843 | 2.8504 | 1.1715 | −8.8248E−04 |
| 844 | 4.5623 | −0.1831 | 2.2582E−01 |
| 845 | 3.5037 | 0.5098 | 3.3814E−01 |
| 846 | 0.9286 | 1.1387 | −8.5382E−04 |
| 847 | 3.3775 | 0.6577 | −1.1334E−01 |
| 848 | 1.0369 | 1.2289 | 5.6328E−01 |
| 849 | 3.618 | 0.0933 | 5.6413E−01 |
| 850 | 1.4955 | 1.4462 | 3.3743E−01 |
| 851 | 0.9356 | 1.2365 | 5.6327E−01 |
| 852 | 4.4522 | −0.0472 | 1.1288E−01 |
| 853 | 0.181 | 1.4614 | 6.7595E−01 |
| 854 | 1.0423 | 1.7102 | 6.7576E−01 |
| 855 | 4.418 | −0.1918 | 3.3866E−01 |
| 856 | 0.8341 | 1.2408 | 5.6327E−01 |
| 857 | 4.5751 | −0.1128 | 1.1292E−01 |
| 858 | 4.5265 | 0.0933 | −6.8764E−05 |
| 859 | 3.5604 | 0.1757 | 4.5123E−01 |
| 860 | 4.9828 | 0.2292 | −1.1301E−01 |
| 861 | 3.8164 | 0.5172 | 1.1245E−01 |
| 862 | 1.765 | 1.203 | 7.8898E−01 |
| 863 | 2.1788 | 1.1189 | 9.9919E−01 |
| 864 | 3.2414 | 0.2798 | 9.9982E−01 |
| 865 | 1.818 | 1.4291 | 7.8881E−01 |
| 866 | 4.635 | 0.0375 | −2.8652E−05 |
| 867 | 3.6636 | 0.0736 | 7.8983E−01 |
| 868 | 2.7148 | 0.9487 | 4.5065E−01 |

-continued

| Point No. | X | Y | Z' |
|---|---|---|---|
| 869 | 0.5398 | 0.5845 | 2.2524E−01 |
| 870 | 1.4686 | 1.6308 | 9.9881E−01 |
| 871 | 0.9152 | 1.3034 | 2.2470E−01 |
| 872 | 0.3522 | 1.83 | 7.8851E−01 |
| 873 | 0.5448 | 1.5522 | 5.6304E−01 |
| 874 | 4.713 | −0.0904 | 1.1291E−01 |
| 875 | 3.0525 | 0.4262 | 9.9971E−01 |
| 876 | 2.9167 | 1.2668 | −1.1379E−01 |
| 877 | 4.5731 | −0.1678 | 2.2580E−01 |
| 878 | 4.2359 | −0.2005 | 4.5151E−01 |
| 879 | 2.3099 | 1.2083 | 3.3762E−01 |
| 880 | 2.9441 | 0.9417 | 2.2497E−01 |
| 881 | 3.8142 | −0.0908 | 6.7711E−01 |
| 882 | 2.4755 | 0.7557 | 5.6363E−01 |
| 883 | 3.5649 | 0.0846 | 9.0266E−01 |
| 884 | 2.8643 | 0.5734 | 9.9960E−01 |
| 885 | 3.1077 | 0.4295 | 4.5104E−01 |
| 886 | 3.7058 | 0.4757 | 2.2532E−01 |
| 887 | 2.9952 | 0.7109 | −1.1338E−01 |
| 888 | 3.2891 | 0.3285 | 4.5112E−01 |
| 889 | 2.5348 | 0.733 | 9.9948E−01 |
| 890 | 0.1182 | 1.0683 | 4.5056E−01 |
| 891 | 3.6059 | 0.2621 | 5.6401E−01 |
| 892 | 2.832 | 0.5607 | 5.6378E−01 |
| 893 | 4.9072 | 0.149 | −1.1295E−01 |
| 894 | 0.1886 | 1.6593 | 7.8864E−01 |
| 895 | 1.6128 | 0.7719 | 1.1226E−01 |
| 896 | 0.9125 | 1.8814 | 9.0131E−01 |
| 897 | 2.4802 | 0.7488 | 2.2512E−01 |
| 898 | 4.2065 | 0.028 | 3.3850E−01 |
| 899 | 0.451 | 1.522 | 5.6306E−01 |
| 900 | 0.1646 | 0.017 | −1.1461E−05 |
| 901 | 1.3926 | 1.309 | −9.8562E−04 |
| 902 | 1.0405 | 1.1918 | −8.9394E−04 |
| 903 | 4.0645 | 0.0265 | 4.5134E−01 |
| 904 | 0.0839 | −0.1538 | −1.1273E−01 |
| 905 | 4.4131 | −0.0075 | 2.2568E−01 |
| 906 | 0.3023 | 1.6386 | 7.8865E−01 |
| 907 | 0.1748 | 1.6686 | 7.8863E−01 |
| 908 | 1.6108 | 1.5166 | 5.6307E−01 |
| 909 | 0.0451 | 0.342 | 1.1258E−01 |
| 910 | 0.658 | 1.9232 | 9.0128E−01 |
| 911 | 2.7191 | 0.7996 | 7.8928E−01 |
| 912 | 1.851 | 0.7144 | −5.3865E−04 |
| 913 | 3.867 | 0.064 | 3.3848E−01 |
| 914 | 2.0921 | 1.2755 | 6.7609E−01 |
| 915 | 4.4335 | −0.1585 | 3.3864E−01 |
| 916 | 2.2229 | 0.9028 | 6.7637E−01 |
| 917 | 2.646 | 0.8548 | 7.8924E−01 |
| 918 | 2.3139 | 1.1644 | 5.6333E−01 |
| 919 | 4.1224 | −0.1455 | 5.6431E−01 |
| 920 | 0.7851 | 0.9713 | −1.1357E−01 |
| 921 | 4.2848 | −0.1535 | 3.3864E−01 |
| 922 | 3.6769 | 0.1618 | 3.3840E−01 |
| 923 | 4.9664 | 0.1949 | −1.1299E−01 |
| 924 | 2.3255 | 0.8839 | 9.0206E−01 |
| 925 | 3.7176 | 0.5815 | 1.1240E−01 |
| 926 | 3.4962 | 0.1182 | 6.7696E−01 |
| 927 | 3.651 | 0.1249 | 4.5127E−01 |
| 928 | 2.6548 | 0.6601 | 5.6371E−01 |
| 929 | 3.877 | 0.5337 | −1.1324E−01 |
| 930 | 4.7066 | −0.0743 | 1.1289E−01 |
| 931 | 3.73 | 0.2613 | 4.5117E−01 |
| 932 | 3.9446 | 0.2111 | 3.3836E−01 |
| 933 | 1.8695 | 1.0877 | 6.7623E−01 |
| 934 | 3.3508 | 0.1288 | 9.0263E−01 |
| 935 | 0.17 | 1.2144 | 5.6329E−01 |
| 936 | 3.2363 | 0.6847 | 3.3801E−01 |
| 937 | 1.9109 | 0.9082 | 3.3784E−01 |
| 938 | 1.2351 | 1.762 | 9.0140E−01 |
| 939 | 3.9996 | 0.4944 | −1.1321E−01 |
| 940 | 3.8323 | 0.0239 | 4.5135E−01 |
| 941 | 0.1885 | 1.213 | 5.6329E−01 |
| 942 | 1.8838 | 1.3651 | −1.0257E−03 |
| 943 | 0.541 | 1.7368 | 9.0142E−01 |
| 944 | 0.1873 | 1.7531 | 7.8857E−01 |
| 945 | 1.8736 | 1.1897 | 9.0183E−01 |
| 946 | 3.8948 | 0.9061 | −1.1352E−01 |
| 947 | 1.9709 | 0.649 | −1.1333E−01 |
| 948 | 4.7827 | −0.0279 | 2.2921E−05 |
| 949 | 0.6323 | 1.4467 | 6.7595E−01 |
| 950 | 0.5138 | 0.8693 | −6.5326E−04 |
| 951 | 0.6661 | 1.3062 | 3.3754E−01 |
| 952 | 4.6022 | 0.2509 | −1.8910E−04 |
| 953 | 3.5006 | 0.3164 | 2.2544E−01 |
| 954 | 2.1727 | 1.2245 | 6.7613E−01 |
| 955 | 2.3734 | 0.7788 | 2.2509E−01 |
| 956 | 0.0383 | 0.3056 | 1.1261E−01 |
| 957 | 3.1985 | 0.3792 | 4.5108E−01 |
| 958 | 2.251 | 0.9361 | 9.0202E−01 |
| 959 | 0.5074 | 1.7835 | 9.9869E−01 |
| 960 | 0.5527 | 1.019 | 1.1207E−01 |
| 961 | 1.9712 | 0.7359 | −5.5011E−04 |
| 962 | 3.357 | 0.2509 | 5.6402E−01 |
| 963 | 1.2727 | 0.9532 | 3.3780E−01 |
| 964 | 3.3257 | 0.6268 | 3.3805E−01 |
| 965 | 4.8026 | −0.0237 | 1.7191E−05 |
| 966 | 2.929 | 0.4175 | 9.9972E−01 |
| 967 | 0.3058 | 1.8629 | 9.0132E−01 |
| 968 | −0.0384 | 0.1459 | −1.1295E−01 |
| 969 | 3.1812 | 0.6661 | −4.9854E−04 |
| 970 | 0.9301 | 0.3963 | −2.9798E−04 |
| 971 | 1.4215 | 1.363 | 1.1182E−01 |
| 972 | 0.7307 | 0.4815 | 1.1248E−01 |
| 973 | 0.0675 | 0.2046 | 1.1269E−01 |
| 974 | 1.6243 | 1.3184 | −1.1383E−01 |
| 975 | 3.7662 | 0.1477 | 5.6409E−01 |
| 976 | 0.2198 | 1.6478 | 7.8865E−01 |
| 977 | 1.514 | 1.3339 | −1.0028E−03 |
| 978 | 1.7527 | 1.3414 | −1.1385E−01 |
| 979 | 3.6125 | 0.537 | 2.2528E−01 |
| 980 | 2.1311 | 1.3511 | −1.0143E−03 |
| 981 | 0.1301 | 1.5589 | 6.7587E−01 |
| 982 | 2.5245 | 0.7244 | 3.3798E−01 |
| 983 | 4.2957 | −0.0782 | 2.2574E−01 |
| 984 | 4.0439 | −0.1704 | 5.6433E−01 |
| 985 | 1.6416 | 1.3636 | 9.9901E−01 |
| 986 | 1.4637 | 1.3929 | 2.2464E−01 |
| 987 | 3.3214 | 0.0998 | 9.9996E−01 |
| 988 | 4.3614 | 0.3596 | −1.1311E−01 |
| 989 | 0.8463 | 0.7141 | 2.2515E−01 |
| 990 | 3.0103 | 0.577 | 7.8945E−01 |
| 991 | 3.1557 | 0.4653 | 7.8954E−01 |
| 992 | 0.7143 | 1.0145 | −7.6214E−04 |
| 993 | 3.4142 | 1.1094 | −1.1367E−01 |
| 994 | 3.4152 | 0.5962 | −4.4697E−04 |
| 995 | 2.8226 | 0.7394 | −5.5585E−04 |
| 996 | 0.1597 | 1.5893 | 6.7585E−01 |
| 997 | 2.8411 | 0.5104 | 9.0234E−01 |
| 998 | 2.5768 | 1.1952 | 1.1194E−01 |
| 999 | 3.0627 | 0.4762 | 9.0237E−01 |
| 1000 | 0.2781 | 1.7643 | 9.0140E−01 |
| 1001 | 1.7033 | 1.4826 | 5.6309E−01 |
| 1002 | 2.6094 | 0.7229 | −1.1338E−01 |
| 1003 | 1.1617 | 1.7529 | 7.8857E−01 |
| 1004 | 1.8108 | 1.4198 | 4.5030E−01 |
| 1005 | 1.4683 | 1.054 | 4.5057E−01 |
| 1006 | 4.547 | −0.1938 | 2.2583E−01 |
| 1007 | 3.3925 | 0.3103 | 3.3829E−01 |
| 1008 | 3.2781 | 0.1836 | 9.0258E−01 |
| 1009 | 1.0269 | 1.3907 | 6.7600E−01 |
| 1010 | 1.0708 | 1.4344 | 3.3744E−01 |
| 1011 | 3.5378 | 0.1051 | 9.0265E−01 |
| 1012 | 1.9743 | 0.9409 | 4.5065E−01 |
| 1013 | 3.4293 | 0.1324 | 9.9994E−01 |
| 1014 | 1.5753 | 1.3898 | 2.2464E−01 |
| 1015 | 1.0706 | 1.6134 | 9.0151E−01 |
| 1016 | 0.5673 | 1.725 | 6.7575E−01 |
| 1017 | 1.6849 | 1.5086 | 9.0159E−01 |
| 1018 | 1.241 | 1.3786 | 2.2465E−01 |
| 1019 | 0.1442 | 0.6889 | 2.2516E−01 |
| 1020 | 2.7679 | 0.5643 | 9.0230E−01 |
| 1021 | 0.543 | 0.7973 | 3.3793E−01 |
| 1022 | 4.2811 | −0.1417 | 4.5147E−01 |

| Point No. | X | Y | Z' |
|---|---|---|---|
| 1023 | 0.1102 | 0.9705 | 4.5064E−01 |
| 1024 | 2.8027 | 0.8324 | 5.6358E−01 |
| 1025 | 0.8346 | 1.608 | 5.6300E−01 |
| 1026 | 3.0642 | 0.3686 | 7.8961E−01 |
| 1027 | 2.3344 | 0.8865 | 9.9937E−01 |
| 1028 | 4.1337 | −0.0229 | 4.5138E−01 |
| 1029 | 3.9811 | 0.0856 | 4.5130E−01 |
| 1030 | 1.7194 | 1.2861 | 9.0176E−01 |
| 1031 | 2.5475 | 0.7252 | 9.0218E−01 |
| 1032 | 4.5665 | −0.1153 | 2.2577E−01 |
| 1033 | 0.6247 | 1.8595 | 7.8849E−01 |
| 1034 | 2.6235 | 0.684 | 3.3801E−01 |
| 1035 | 1.1578 | 1.0754 | 4.5056E−01 |
| 1036 | 2.7943 | 0.639 | 2.2520E−01 |
| 1037 | 4.8695 | 0.1442 | −1.1295E−01 |
| 1038 | 0.9478 | 1.7232 | 6.7575E−01 |
| 1039 | 1.5932 | 0.9509 | 3.3780E−01 |
| 1040 | 1.6884 | 1.1714 | 6.7617E−01 |
| 1041 | 4.7084 | −0.1243 | 1.1293E−01 |
| 1042 | 0.1652 | 1.7285 | 7.8858E−01 |
| 1043 | 2.4578 | 0.7698 | −5.7877E−04 |
| 1044 | 1.8991 | 1.3641 | 9.0170E−01 |
| 1045 | 3.3067 | 0.9785 | −7.3349E−04 |
| 1046 | 2.601 | 0.681 | 9.9952E−01 |
| 1047 | 0.5331 | 1.8576 | 7.8849E−01 |
| 1048 | 3.3892 | 0.0506 | 9.9999E−01 |
| 1049 | 4.4779 | 0.6133 | −1.1330E−01 |
| 1050 | 3.0077 | 0.4586 | 5.6386E−01 |
| 1051 | 0.0385 | −0.1711 | −1.1271E−01 |
| 1052 | 0.2904 | 1.8546 | 9.0133E−01 |
| 1053 | 1.4988 | 0.7484 | 1.1228E−01 |
| 1054 | 0.8506 | 0.888 | 3.3786E−01 |
| 1055 | 3.0595 | 0.3112 | 9.9980E−01 |
| 1056 | 0.7162 | 1.8547 | 7.8849E−01 |
| 1057 | 0.3147 | −0.04 | −1.1281E−01 |
| 1058 | 0.8982 | 1.6714 | 9.0147E−01 |
| 1059 | 1.421 | 1.3783 | 7.8885E−01 |
| 1060 | 1.6865 | 1.3804 | 2.2464E−01 |
| 1061 | 0.1873 | 1.7531 | 7.8857E−01 |
| 1062 | 1.022 | 1.3359 | 2.2468E−01 |
| 1063 | 4.4208 | −0.1244 | 3.3861E−01 |
| 1064 | 0.2524 | 1.7873 | 9.0138E−01 |
| 1065 | 3.8999 | −0.1449 | 6.7715E−01 |
| 1066 | 0.099 | 0.7088 | 3.3799E−01 |
| 1067 | 3.1247 | 0.258 | 9.9984E−01 |
| 1068 | 4.0321 | 0.1504 | 3.3841E−01 |
| 1069 | 4.8528 | 0.0363 | −2.8652E−05 |
| 1070 | 4.1997 | 0.2587 | −1.9483E−04 |
| 1071 | 2.1709 | 0.8744 | 4.5070E−01 |
| 1072 | 4.2065 | 0.028 | 3.3850E−01 |
| 1073 | 2.4015 | 0.8357 | 9.9940E−01 |
| 1074 | 2.744 | 0.5843 | 7.8944E−01 |
| 1075 | 0.2752 | 1.8458 | 9.0133E−01 |
| 1076 | 2.1568 | 0.8269 | 2.2506E−01 |
| 1077 | 3.33 | 0.717 | 2.2514E−01 |
| 1078 | 2.0532 | 1.2168 | 9.9912E−01 |
| 1079 | 2.3658 | 1.1612 | 4.5049E−01 |
| 1080 | 3.3034 | 0.2053 | 7.8973E−01 |
| 1081 | 1.7343 | 1.4551 | 9.9894E−01 |
| 1082 | 3.7047 | 0.0405 | 5.6417E−01 |
| 1083 | 1.6803 | 1.2493 | 7.8894E−01 |
| 1084 | 3.9622 | 0.0153 | 3.3851E−01 |
| 1085 | 0.4492 | 1.9011 | 9.9861E−01 |
| 1086 | 1.603 | 1.5453 | 9.9887E−01 |
| 1087 | 4.7432 | −0.0197 | 1.7191E−05 |
| 1088 | 1.3857 | 0.7208 | 1.1230E−01 |
| 1089 | 1.041 | 0.4474 | −3.3809E−04 |
| 1090 | 2.9662 | 1.1273 | −8.4809E−04 |
| 1091 | 4.496 | 0.3146 | −2.3494E−04 |
| 1092 | 4.4178 | 0.1489 | −1.1461E−04 |
| 1093 | 1.6136 | 0.6575 | −4.9281E−04 |
| 1094 | 0.955 | 0.911 | 3.3784E−01 |
| 1095 | 3.8138 | 0.203 | 4.5121E−01 |
| 1096 | 0.182 | 1.1477 | 4.5050E−01 |
| 1097 | 2.2018 | 0.8898 | 5.6354E−01 |
| 1098 | 3.1676 | 1.195 | −1.1374E−01 |
| 1099 | 0.1327 | 1.3357 | 5.6320E−01 |
| 1100 | 1.3328 | 1.4175 | 7.8882E−01 |
| 1101 | 2.9913 | 0.4393 | 6.7672E−01 |
| 1102 | 0.8306 | 1.4257 | 6.7597E−01 |
| 1103 | 0.3759 | 1.8679 | 9.9863E−01 |
| 1104 | 2.5539 | 0.7143 | 4.5082E−01 |
| 1105 | 0.0839 | −0.1538 | −1.1273E−01 |
| 1106 | 3.6 | 0.267 | 2.2548E−01 |
| 1107 | 2.1791 | 0.9552 | 7.8917E−01 |
| 1108 | 3.9261 | 0.0326 | 5.6418E−01 |
| 1109 | 4.1523 | −0.0825 | 3.3858E−01 |
| 1110 | 1.1159 | 1.8147 | 9.9867E−01 |
| 1111 | 4.2545 | −0.1099 | 4.5144E−01 |
| 1112 | 2.4737 | 0.7784 | 9.0214E−01 |
| 1113 | 0.2769 | 0.0648 | −5.1573E−05 |
| 1114 | 1.5886 | 1.546 | 6.7588E−01 |
| 1115 | 3.7464 | −0.0458 | 6.7708E−01 |
| 1116 | 0.8974 | 1.8278 | 7.8851E−01 |
| 1117 | 1.9901 | 1.2654 | 9.9908E−01 |
| 1118 | 1.7205 | 0.5894 | −1.1328E−01 |
| 1119 | 2.4283 | 0.9207 | 9.9934E−01 |
| 1120 | 3.3214 | 0.0998 | 9.9996E−01 |
| 1121 | 1.3795 | 0.9573 | 3.3780E−01 |
| 1122 | 0.1646 | 0.017 | −1.1461E−05 |
| 1123 | 4.0574 | −0.0334 | 3.3854E−01 |
| 1124 | 0.2336 | 0.9533 | 4.5065E−01 |
| 1125 | 3.3827 | 0.1503 | 7.8977E−01 |
| 1126 | 2.8649 | 0.6885 | 7.8937E−01 |
| 1127 | 0.6315 | 1.7276 | 9.0143E−01 |
| 1128 | 2.3849 | 0.8018 | 5.6360E−01 |
| 1129 | 3.3148 | 0.5392 | 1.1244E−01 |
| 1130 | 2.5526 | 0.8212 | 9.9942E−01 |
| 1131 | 0.5719 | 1.7798 | 9.9870E−01 |
| 1132 | 0.8199 | 1.0794 | −8.1371E−04 |
| 1133 | 0.7194 | 1.7611 | 9.9871E−01 |
| 1134 | 1.5362 | 1.5887 | 9.9884E−01 |
| 1135 | 0.5327 | 1.452 | 6.7595E−01 |
| 1136 | 3.5184 | 0.708 | 1.1231E−01 |
| 1137 | 0.4281 | 1.2274 | 5.6328E−01 |
| 1138 | 4.3494 | −0.1918 | 3.3866E−01 |
| 1139 | 2.0092 | 1.3517 | 1.1182E−01 |
| 1140 | 0.9866 | 1.8069 | 7.8853E−01 |
| 1141 | 0.0411 | −0.0083 | 5.7304E−06 |
| 1142 | 3.7985 | 0.1678 | 2.2555E−01 |
| 1143 | 3.638 | 0.8104 | −6.0742E−04 |
| 1144 | 1.2616 | 1.0727 | 4.5056E−01 |
| 1145 | 3.923 | −0.0267 | 4.5138E−01 |
| 1146 | 1.912 | 1.3599 | 3.3750E−01 |
| 1147 | 2.8018 | 0.6227 | 9.9956E−01 |
| 1148 | 0.0995 | 0.7965 | 3.3793E−01 |
| 1149 | 2.0156 | 1.3191 | 2.2469E−01 |
| 1150 | 0.2635 | 1.774 | 9.0139E−01 |
| 1151 | 4.578 | −0.1498 | 2.2579E−01 |
| 1152 | 4.4941 | −0.1847 | 2.2582E−01 |
| 1153 | 1.7609 | 1.4642 | 6.7594E−01 |
| 1154 | 1.1146 | 0.3739 | −1.1312E−01 |
| 1155 | 0.5724 | 1.2557 | 3.3758E−01 |
| 1156 | 3.5216 | −0.0031 | 9.0273E−01 |
| 1157 | 3.6633 | 0.0092 | 6.7704E−01 |
| 1158 | 2.9631 | 0.7179 | 5.6366E−01 |
| 1159 | 4.0991 | −0.1757 | 5.6434E−01 |
| 1160 | 2.4395 | 1.1797 | 2.2480E−01 |
| 1161 | 2.4594 | 0.7572 | 4.5079E−01 |
| 1162 | 0.6122 | 0.9444 | −7.1057E−04 |
| 1163 | 0.7088 | 1.4515 | 4.5027E−01 |
| 1164 | −0.153 | −0.1032 | −1.1276E−01 |
| 1165 | 1.3131 | 1.5279 | 4.5021E−01 |
| 1166 | 4.2466 | 0.0617 | 1.1280E−01 |
| 1167 | 3.1236 | 0.6038 | 5.6375E−01 |
| 1168 | 4.3624 | 0.674 | −1.1335E−01 |
| 1169 | 1.4104 | 1.2816 | 6.7608E−01 |
| 1170 | 2.7239 | 0.7419 | 9.0217E−01 |
| 1171 | 2.3317 | 1.1193 | 6.7620E−01 |
| 1172 | 3.9261 | 0.0326 | 5.6418E−01 |
| 1173 | 2.4103 | 1.0653 | 6.7624E−01 |
| 1174 | 3.0271 | 0.6168 | 6.7658E−01 |
| 1175 | 1.8923 | 1.367 | 1.1181E−01 |
| 1176 | 2.4791 | 1.0571 | 5.6341E−01 |

-continued

| Point No. | X | Y | Z' |
|---|---|---|---|
| 1177 | 2.2298 | 1.2561 | 2.2474E−01 |
| 1178 | 2.7456 | 1.0439 | 2.2489E−01 |
| 1179 | 0.9511 | 0.7503 | 2.2512E−01 |
| 1180 | 0.1517 | 1.2175 | 5.6329E−01 |
| 1181 | 0.9064 | 1.5032 | 4.5023E−01 |
| 1182 | 0.1676 | 0.9142 | 3.3783E−01 |
| 1183 | 1.1534 | 1.4888 | 7.8877E−01 |
| 1184 | 4.8283 | 0.1099 | −8.0225E−05 |
| 1185 | 3.9226 | −0.0495 | 6.7708E−01 |
| 1186 | 1.5006 | 1.5826 | 6.7586E−01 |
| 1187 | −0.0321 | 0.1132 | −8.5955E−05 |
| 1188 | 2.466 | 1.2357 | 1.1191E−01 |
| 1189 | 0.3416 | 1.2747 | 4.5041E−01 |
| 1190 | −0.1043 | −0.1788 | −1.1270E−01 |
| 1191 | 3.4247 | 0.6578 | 2.2519E−01 |
| 1192 | 0.3288 | 0.7046 | −5.2719E−04 |
| 1193 | 3.5186 | 0.1856 | 7.8975E−01 |
| 1194 | 2.4236 | 0.7983 | 1.1224E−01 |
| 1195 | 2.9251 | 0.5284 | 4.5096E−01 |
| 1196 | 0.7439 | 1.0471 | 4.5057E−01 |
| 1197 | 0.4595 | 0.9468 | 1.1213E−01 |
| 1198 | 3.7468 | 0.7512 | −5.6731E−04 |
| 1199 | 3.4873 | 0.2608 | 3.3833E−01 |
| 1200 | 0.0907 | 0.7375 | 3.3797E−01 |
| 1201 | 0.7576 | 1.735 | 6.7574E−01 |
| 1202 | 4.2417 | 0.4071 | −1.1315E−01 |
| 1203 | 1.959 | 0.8145 | 1.1223E−01 |
| 1204 | 0.0343 | 0.2542 | −1.1303E−01 |
| 1205 | 0.1751 | 1.7418 | 7.8857E−01 |
| 1206 | 0.0368 | 0.2687 | 1.1264E−01 |
| 1207 | 2.6638 | 0.6381 | 7.8940E−01 |
| 1208 | 4.3292 | −0.0587 | 3.3857E−01 |
| 1209 | 1.5694 | 1.4069 | 9.9898E−01 |
| 1210 | 2.9156 | 0.5517 | 3.3811E−01 |
| 1211 | 3.7782 | −0.0308 | 7.8991E−01 |
| 1212 | 0.7214 | 1.7136 | 9.0144E−01 |
| 1213 | 2.073 | 0.909 | 4.5068E−01 |
| 1214 | 0.6402 | 1.5765 | 5.6302E−01 |
| 1215 | 3.3086 | 0.5501 | 4.5095E−01 |
| 1216 | 1.8544 | 1.2278 | 9.9911E−01 |
| 1217 | 3.083 | 0.5212 | 7.8950E−01 |
| 1218 | 0.1439 | 1.1057 | 4.5053E−01 |
| 1219 | 2.2538 | 1.3342 | −1.0028E−03 |
| 1220 | 0.1747 | 0.2102 | 1.1268E−01 |
| 1221 | 2.9659 | 0.855 | 3.3788E−01 |
| 1222 | 0.7317 | 1.4381 | 6.7597E−01 |
| 1223 | 0.8018 | 1.744 | 9.9872E−01 |
| 1224 | 3.2554 | 0.152 | 9.9992E−01 |
| 1225 | 1.0747 | 1.7817 | 7.8854E−01 |
| 1226 | −0.0253 | 0.1549 | −1.1461E−04 |

It will also be appreciated that the airfoil disclosed in the above Table I may be scaled up or down geometrically for use in other similar turbine designs. Consequently, the coordinate values set forth in Table I may be scaled upwardly or downwardly such that the airfoil profile shape remains unchanged. A scaled version of the coordinates in Table I would be represented by X, Y and Z' coordinate values of Table I, with the non-dimensional Z' coordinate value converted to inches, multiplied or divided by a constant number.

An important term in this disclosure is profile. The profile is the range of the variation between measured points on an airfoil surface and the ideal position listed in Table I. The actual profile on a manufactured blade will be different then those in Table I and the design is robust to this variation meaning that mechanical and aerodynamic function are not impaired. As noted above, a + or −0.04 inch profile tolerance is used herein.

The disclosed airfoil shape optimizes and is specific to the machine conditions and specifications. It provides a unique profile to achieve 1) interaction between other stages in the high pressure turbine; 2) aerodynamic efficiency; and 3) normalized aerodynamic and mechanical blade loadings. The disclosed loci of points allow the CV7241 to run in an efficient, safe and smooth manner. As also noted, any scale of the disclosed airfoil may be adopted as long as 1) interaction between other stages in the high pressure turbine; 2) aerodynamic efficiency; and 3) normalized aerodynamic and mechanical blade loadings are maintained in the scaled turbine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine bucket including a bucket airfoil having an airfoil shape, said airfoil having a nominal profile substantially in accordance with Cartesian coordinate values of X, Y and Z' set forth in Table I wherein the Z' values are non-dimensional values from 0 to 1 convertible to Z distances in inches by multiplying the Z' values by a height of the airfoil in inches, and wherein X and Y are distances in inches which, when connected by smooth continuing arcs, define airfoil profile sections at each distance Z, the profile sections at the Z distances being joined smoothly with one another to form a complete airfoil shape.

2. A turbine bucket according to claim 1, forming part of a third stage of a turbine.

3. A turbine bucket according to claim 1 wherein said airfoil shape lies in an envelope within +/−0.040 inches in a direction normal to any airfoil surface location.

4. A turbine bucket according to claim 1 wherein the height of the turbine bucket from root to tip is 15.752 inches.

5. A turbine bucket including a bucket airfoil having an uncoated nominal airfoil profile substantially in accordance with Cartesian coordinate values of X, Y and Z' set forth in Table I wherein the Z' values are non-dimensional values from 0 to 1 convertible to Z distances in inches by multiplying the Z' values by a height of the airfoil in inches, and wherein X and Y are distances in inches which, when connected by smooth continuing arcs, define airfoil profile sections at each Z distance, the profile sections at the Z distances being joined smoothly with one another to form a complete airfoil shape, the X, Y and Z distances being scalable as a function of the same constant or number to provide a scaled-up or scaled-down airfoil.

6. A turbine bucket according to claim 5, forming part of a third stage of a turbine.

7. A turbine bucket according to claim 5, wherein said airfoil shape lies in an envelope within +/−0.040 inches in a direction normal to any airfoil surface location.

8. A turbine bucket according to claim 5 wherein the height of the turbine bucket from root to tip is 15.752 inches.

9. A turbine comprising a turbine wheel having a plurality of buckets, each of said buckets including an airfoil having an airfoil shape, said airfoil having a nominal profile substantially in accordance with Cartesian coordinate values of X, Y and Z' set forth in Table I wherein the Z' values are non-dimensional values from 0 to 1 convertible to Z distances in inches by multiplying the Z' values by a height of the airfoil in inches, and wherein X and Y are distances in inches which, when connected by smooth continuing arcs, define the airfoil profile sections at each distance Z, the profile sections at the Z distances being joined smoothly with one another to form a complete airfoil shape.

10. A turbine according to claim 9, wherein the turbine wheel comprises a third stage of the turbine.

11. A turbine according to claim 9, wherein X represents a distance parallel to the turbine axis of rotation.

12. A turbine according to claim 9, wherein the height of the turbine bucket from root to tip is 15.752 inches.

13. A turbine according to claim 9, wherein the Z height between an axial centerline of said turbine wheel and a base of the airfoil as defined in Table 1 is 38.250 inches and which corresponds to the non-dimensionalized Z at 0.000.

14. A turbine according to claim 13, wherein the height of the turbine bucket from root to tip is 15.752 inches.

15. A turbine according to claim 9, wherein the X, Y and Z distances are scalable as a function of the same constant or number to provide a scaled-up or scaled-down bucket airfoil.

16. A turbine according to claim 15, wherein the turbine wheel comprises a third stage of the turbine.

17. A turbine according to claim 15, wherein X represents a distance parallel to the turbine axis of rotation.

18. A turbine according to claim 15, wherein the height of the turbine bucket from root to tip is 15.752 inches.

19. A turbine according to claim 15, wherein the Z height between an axial centerline of said turbine wheel and a base of the airfoil as defined in Table 1 is 38.250 inches and which corresponds to the non-dimensionalized Z at 0.000.

20. A turbine according to claim 15, said airfoil shape lying in an envelope within +/−0.040 inches in a direction normal to any airfoil surface location.

\* \* \* \* \*